(12) United States Patent
Kuo

(10) Patent No.: US 10,872,278 B1
(45) Date of Patent: Dec. 22, 2020

(54) CORRECTING TONE SCALE ERRORS IN A DIGITAL PRINTER

(71) Applicant: Eastman Kodak Company, Rochester, NY (US)

(72) Inventor: Chung-Hui Kuo, Fairport, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 16/581,909

(22) Filed: Sep. 25, 2019

(51) Int. Cl.
*G06F 15/00* (2006.01)
*G06K 15/02* (2006.01)

(52) U.S. Cl.
CPC .................................. *G06K 15/027* (2013.01)

(58) Field of Classification Search
CPC ....................................................... G06K 15/027
USPC ........................................................... 358/1.14
See application file for complete search history.

(56) References Cited

U.S. PATENT DOCUMENTS

| | | | |
|---|---|---|---|
| 5,841,552 A | 11/1998 | Atobe et al. | |
| 6,086,441 A | 7/2000 | Akiguchi et al. | |
| 6,333,792 B1 | 12/2001 | Kimura | |
| 6,452,696 B1 | 9/2002 | Bogart et al. | |
| 6,554,388 B1 | 4/2003 | Wong et al. | |
| 7,038,816 B2 | 5/2006 | Klassen et al. | |
| 7,058,325 B2 | 6/2006 | Hamby et al. | |
| 7,079,281 B1 | 7/2006 | Ng et al. | |
| 7,079,287 B1 | 7/2006 | Ng et al. | |
| 7,218,420 B1 | 5/2007 | Tai et al. | |
| 7,564,475 B1 | 7/2009 | Mizes | |
| 7,626,730 B2 | 12/2009 | Tai et al. | |
| 7,663,654 B2 | 2/2010 | Arai et al. | |
| 7,830,569 B2 | 11/2010 | Tai et al. | |
| 8,482,802 B2 | 7/2013 | Kuo et al. | |
| 8,493,623 B2 | 7/2013 | Tai et al. | |
| 8,559,061 B2 | 10/2013 | Dobbertin et al. | |
| 8,824,907 B2 | 9/2014 | Kuo et al. | |
| 9,030,516 B2 | 5/2015 | Munechika et al. | |
| 9,147,232 B1 | 9/2015 | Kuo | |
| 9,565,337 B1 | 2/2017 | Kuo et al. | |
| 9,712,712 B1 * | 7/2017 | Kuo | G03G 15/04054 |
| 10,062,017 B2 | 7/2018 | Kuo et al. | |
| 10,036,975 B1 | 8/2018 | Kuo et al. | |
| 10,126,696 B1 | 11/2018 | Kuo et al. | |
| 10,192,150 B2 | 1/2019 | Kuo et al. | |
| 2005/0036705 A1 | 2/2005 | Viassolo et al. | |
| 2005/0134624 A1 | 6/2005 | Mizes | |

(Continued)

*Primary Examiner* — Mark R Milia
(74) *Attorney, Agent, or Firm* — Kevin E. Spaulding; David A. Novais

(57) ABSTRACT

A method for correcting tone-level non-uniformities in a digital printing system includes printing a test target having a set of uniform test patches. The printed test target is automatically analyzed to determine tone-level errors as a function of cross-track position for each of the test patches. A tone-level correction function is determined and represented using a set of one-dimensional feature vectors which specifies tone-level corrections as a function of cross-track position and pixel value. Corrected image data is determined by using the tone-level correction function to determine a tone-level correction value for each image pixel responsive to the input pixel value and cross-track position of the image pixel. The corrected image data is printed using the digital printing system to provide a printed image with reduced tone-level errors.

12 Claims, 21 Drawing Sheets

(56) References Cited

U.S. PATENT DOCUMENTS

| | | |
|---|---|---|
| 2006/0133870 A1 | 6/2006 | Ng et al. |
| 2007/0211913 A1 | 9/2007 | Washio et al. |
| 2007/0229894 A1 | 10/2007 | Siemens et al. |
| 2008/0144076 A1 | 6/2008 | Boliek et al. |
| 2008/0226361 A1 | 9/2008 | Tomita et al. |
| 2010/0097657 A1 | 4/2010 | Tai et al. |
| 2015/0116408 A1* | 4/2015 | Armbruster ............ B41J 2/2135 347/15 |
| 2017/0302861 A1* | 10/2017 | Shibata .............. H04N 5/35581 |

* cited by examiner

CORRECTING TONE SCALE ERRORS IN A DIGITAL PRINTER

CROSS-REFERENCE TO RELATED APPLICATIONS

Reference is made to commonly assigned, co-pending U.S. patent application Ser. No. 16/417,731, entitled "Correcting cross-track errors in a linear printhead", by Kuo et al.; to commonly assigned, co-pending U.S. patent application Ser. No. 16/417,763, entitled "Printer with cross-track position error correction", by Kuo et al.; to commonly assigned, co-pending U.S. patent application Ser. No. 16/564,235, entitled: "Correcting-in-track errors in a linear printhead", by Kuo et al.; and to commonly assigned, co-pending U.S. patent application Ser. No. 16/564,255, entitled: "Printer with in-track position error correction", by Kuo et al., each of which is incorporated herein by reference.

FIELD OF THE INVENTION

This invention pertains to the field of digital printing, and more particularly to a method for correcting tone scale errors that vary in the cross-track direction, and optionally in the in-track direction.

BACKGROUND OF THE INVENTION

Electrophotography is a useful process for printing images on a receiver (or "imaging substrate"), such as a piece or sheet of paper or another planar medium (e.g., glass, fabric, metal, or other objects) as will be described below. In this process, an electrostatic latent image is formed on a photoreceptor by uniformly charging the photoreceptor and then discharging selected areas of the uniform charge to yield an electrostatic charge pattern corresponding to the desired image (i.e., a "latent image").

After the latent image is formed, charged toner particles are brought into the vicinity of the photoreceptor and are attracted to the latent image to develop the latent image into a toner image. Note that the toner image may not be visible to the naked eye depending on the composition of the toner particles (e.g., clear toner).

After the latent image is developed into a toner image on the photoreceptor, a suitable receiver is brought into juxtaposition with the toner image. A suitable electric field is applied to transfer the toner particles of the toner image to the receiver to form the desired print image on the receiver. The imaging process is typically repeated many times with reusable photoreceptors.

The receiver is then removed from its operative association with the photoreceptor and subjected to heat or pressure to permanently fix (i.e., "fuse") the print image to the receiver. Plural print images (e.g., separation images of different colors) can be overlaid on the receiver before fusing to form a multi-color print image on the receiver.

It has been observed that there can be uniformity artifacts such as image streaks in printed images formed using digital printing systems such as electrophotographic printers. In many cases, the characteristics of these uniformity artifacts have been found to vary as a function of the image density. There remains a need for improved methods to characterize and correct for such artifacts.

SUMMARY OF THE INVENTION

The present invention represents a method for correcting tone-level non-uniformities in a digital printing system, including:

a) providing digital image data for a test target including a set of uniform test patches, each test patch having an associated pixel value and extending in a cross-track direction;

b) printing the test target using the digital printing system to provide a printed test target;

c) using a digital image capture system to capture an image of the printed test target;

d) using a data processing system to automatically analyze the captured image to determine a measured tone-level as a function of cross-track position for each of the test patches;

e) comparing the measured tone-levels to nominal tone-levels for each test patch to determine measured tone-level errors as a function of cross-track position for each of the test patches;

f) determining a tone-level correction function responsive to the measured tone-level errors, wherein the tone-level correction function specifies tone-level corrections to be applied as a function of cross-track position and pixel value;

g) storing a representation of the tone-level correction function in a digital memory, wherein the representation of the tone-level correction function includes a set of one-dimensional feature vectors corresponding to a decomposition of the tone-level correction function into a summation of outer vector products of the one-dimensional feature vectors;

h) receiving digital image data for an input digital image to be printed by the digital imaging system, wherein the digital image data specifies input pixel values for an array of image pixels;

i) determining corrected image data by:
  using the stored representation of the tone-level correction function to determine a tone-level correction value for each image pixel responsive to the input pixel value and cross-track position of the image pixel; and
  modifying the input pixel value for each image pixel responsive to the determined tone-level correction value to provide a corrected pixel value;

j) printing the corrected image data using the digital printing system to provide a printed image with reduced tone-level errors.

This invention has the advantage that tone-level errors such as streak artifacts that vary as a function of cross-track position and tone-level can be significantly reduced, regardless of the source of those errors.

It has the additional advantage that the representation of the tone-level correction function using the one-dimensional feature vectors requires a reduced amount of storage memory.

It has the further advantage that the tone-level correction function can also be used to correct for tone-level errors that vary as a function of in-track position.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
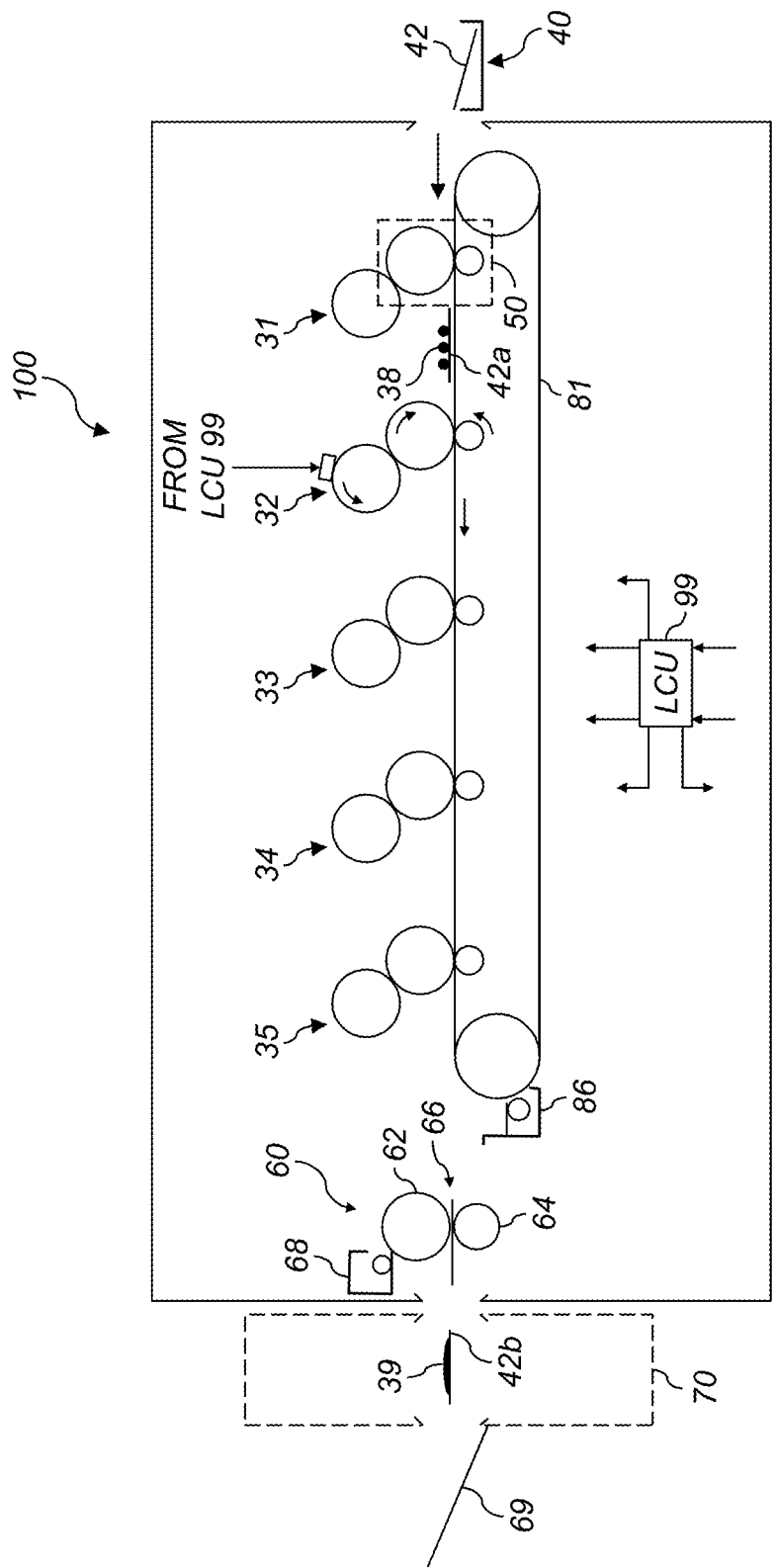
FIG. 1 is an elevational cross-section of an electrophotographic printer suitable for use with various embodiments.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated, or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

As used herein, the terms "parallel" and "perpendicular" have a tolerance of ±10°.

As used herein, "sheet" is a discrete piece of media, such as receiver media for an electrophotographic printer (described below). Sheets have a length and a width. Sheets are folded along fold axes (e.g., positioned in the center of the sheet in the length dimension, and extending the full width of the sheet). The folded sheet contains two "leaves," each leaf being that portion of the sheet on one side of the fold axis. The two sides of each leaf are referred to as "pages." "Face" refers to one side of the sheet, whether before or after folding.

As used herein, "toner particles" are particles of one or more material(s) that are transferred by an electrophotographic (EP) printer to a receiver to produce a desired effect or structure (e.g., a print image, texture, pattern, or coating) on the receiver. Toner particles can be ground from larger solids, or chemically prepared (e.g., precipitated from a solution of a pigment and a dispersant using an organic solvent), as is known in the art. Toner particles can have a range of diameters (e.g., less than 8 µm, on the order of 10-15 µm, up to approximately 30 µm, or larger), where "diameter" preferably refers to the volume-weighted median diameter, as determined by a device such as a Coulter Multisizer. When practicing this invention, it is preferable to use larger toner particles (i.e., those having diameters of at least 20 µm) in order to obtain the desirable toner stack heights that would enable macroscopic toner relief structures to be formed.

"Toner" refers to a material or mixture that contains toner particles, and that can be used to form an image, pattern, or coating when deposited on an imaging member including a photoreceptor, a photoconductor, or an electrostatically-charged or magnetic surface. Toner can be transferred from the imaging member to a receiver. Toner is also referred to in the art as marking particles, dry ink, or developer, but note that herein "developer" is used differently, as described below. Toner can be a dry mixture of particles or a suspension of particles in a liquid toner base.

As mentioned already, toner includes toner particles; it can also include other types of particles. The particles in toner can be of various types and have various properties. Such properties can include absorption of incident electromagnetic radiation (e.g., particles containing colorants such as dyes or pigments), absorption of moisture or gasses (e.g., desiccants or getters), suppression of bacterial growth (e.g., biocides, particularly useful in liquid-toner systems), adhesion to the receiver (e.g., binders), electrical conductivity or low magnetic reluctance (e.g., metal particles), electrical resistivity, texture, gloss, magnetic remanence, florescence, resistance to etchants, and other properties of additives known in the art.

In single-component or mono-component development systems, "developer" refers to toner alone. In these systems, none, some, or all of the particles in the toner can themselves be magnetic. However, developer in a mono-component system does not include magnetic carrier particles. In dual-component, two-component, or multi-component development systems, "developer" refers to a mixture including toner particles and magnetic carrier particles, which can be electrically-conductive or -non-conductive. Toner particles can be magnetic or non-magnetic. The carrier particles can be larger than the toner particles (e.g., 15-20 µm or 20-300 µm in diameter). A magnetic field is used to move the developer in these systems by exerting a force on the magnetic carrier particles. The developer is moved into proximity with an imaging member or transfer member by the magnetic field, and the toner or toner particles in the developer are transferred from the developer to the member by an electric field, as will be described further below. The magnetic carrier particles are not intentionally deposited on the member by action of the electric field; only the toner is intentionally deposited. However, magnetic carrier particles, and other particles in the toner or developer, can be unintentionally transferred to an imaging member. Developer can include other additives known in the art, such as those listed above for toner. Toner and carrier particles can be substantially spherical or non-spherical.

The electrophotographic process can be embodied in devices including printers, copiers, scanners, and facsimiles, and analog or digital devices, all of which are referred to herein as "printers." Various embodiments described herein are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields). The present invention can be practiced using any type of electrographic printing system, including electrophotographic and ionographic printers.

A digital reproduction printing system ("printer") typically includes a digital front-end processor (DFE), a print engine (also referred to in the art as a "marking engine") for applying toner to the receiver, and one or more post-printing finishing system(s) (e.g., a UV coating system, a glosser system, or a laminator system). A printer can reproduce pleasing black-and-white or color images onto a receiver. A printer can also produce selected patterns of toner on a receiver, which patterns (e.g., surface textures) do not correspond directly to a visible image.

In an embodiment of an electrophotographic modular printing machine useful with various embodiments (e.g., the NEXPRESS SX 3900 printer manufactured by Eastman Kodak Company of Rochester, N.Y.) color-toner print images are made in a plurality of color imaging modules arranged in tandem, and the print images are successively electrostatically transferred to a receiver adhered to a transport web moving through the modules. Colored toners include colorants, (e.g., dyes or pigments) which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. The provision of a clear-toner overcoat to a color print is desirable for providing features such as protecting the print from fingerprints, reducing certain visual artifacts or providing desired texture or surface finish characteristics. Clear toner uses particles that are similar to the toner particles of the color development stations but without colored material (e.g., dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective color toners are deposited one upon the other at respective locations on the receiver and the height of a respective color toner stack is the sum of the toner heights of each respective color. Uniform stack height provides the print with a more even or uniform gloss.

Figure 2:
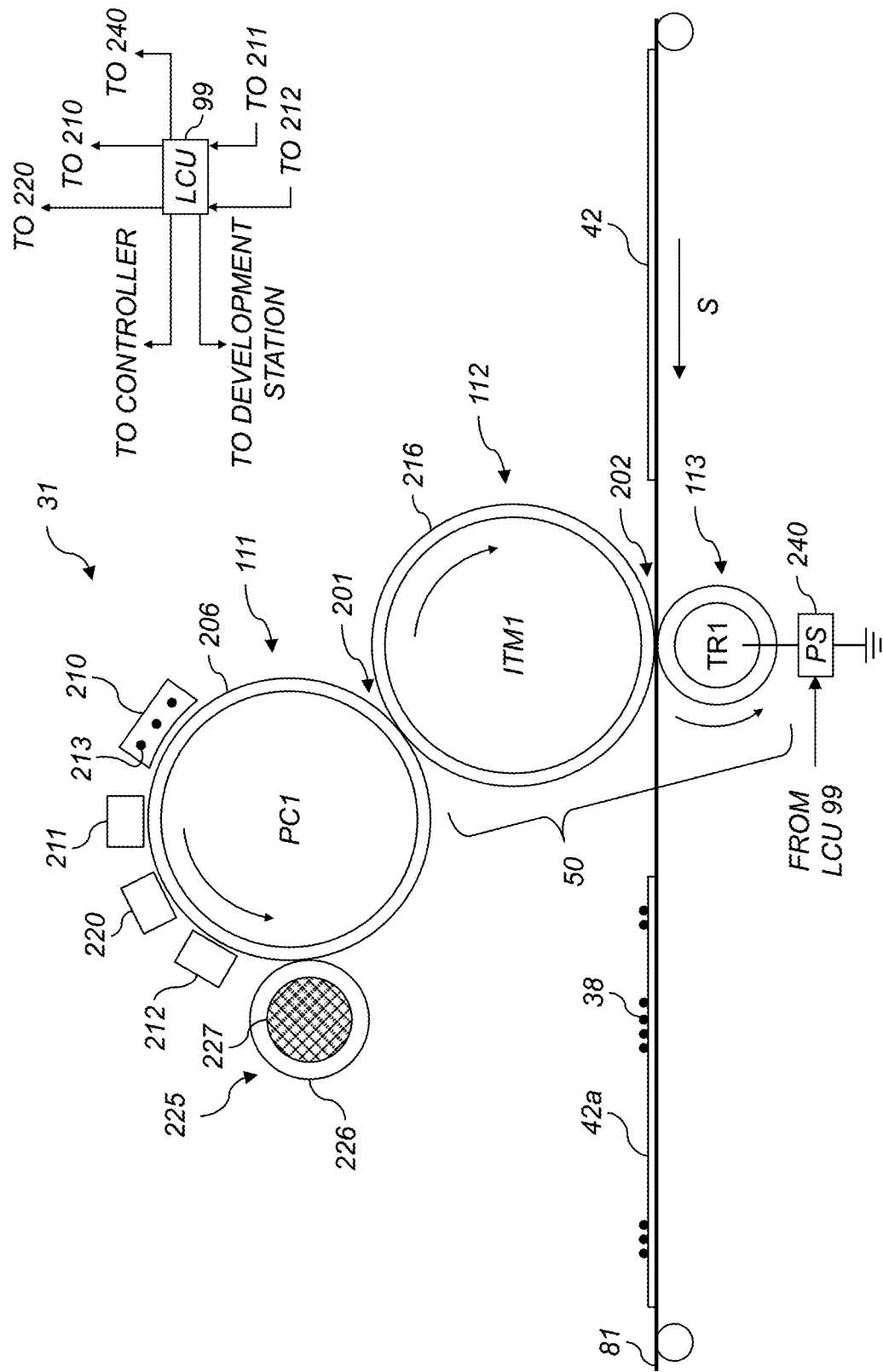
FIG. 2 is an elevational cross-section of one printing subsystem of the electrophotographic printer of FIG. 1.

FIGS. 1-2 are elevational cross-sections showing portions of a typical electrophotographic printer 100 useful with various embodiments. Printer 100 is adapted to produce images, such as single-color images (i.e., monochrome images), or multicolor images such as CMYK, or pentachrome (five-color) images, on a receiver. Multicolor images are also known as "multi-component" images. One embodiment involves printing using an electrophotographic print engine having five sets of single-color image-producing or image-printing stations or modules arranged in tandem, but more or less than five colors can be combined on a single receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing subsystems 31, 32, 33, 34, 35, also known as electrophotographic imaging subsystems. Each printing subsystem 31, 32, 33, 34, 35 produces a single-color toner image for transfer using a respective transfer subsystem 50 (for clarity, only one is labeled) to a receiver 42 successively moved through the modules. In some embodiments one or more of the printing subsystem 31, 32, 33, 34, 35 can print a colorless toner image, which can be used to provide a protective overcoat or tactile image features. Receiver 42 is transported from supply unit 40, which can include active feeding subsystems as known in the art, into printer 100 using a transport web 81. In various embodiments, the visible image can be transferred directly from an imaging roller to a receiver, or from an imaging roller to one or more transfer roller(s) or belt(s) in sequence in transfer subsystem 50, and then to receiver 42. Receiver 42 is, for example, a selected section of a web or a cut sheet of a planar receiver media such as paper or transparency film.

In the illustrated embodiments, each receiver 42 can have up to five single-color toner images transferred in registration thereon during a single pass through the five printing subsystems 31, 32, 33, 34, 35 to form a pentachrome image. As used herein, the term "pentachrome" implies that in a print image, combinations of various of the five colors are combined to form other colors on the receiver at various locations on the receiver, and that all five colors participate to form process colors in at least some of the subsets. That is, each of the five colors of toner can be combined with toner of one or more of the other colors at a particular location on the receiver to form a color different than the colors of the toners combined at that location. In an exemplary embodiment, printing subsystem 31 forms black (K) print images, printing subsystem 32 forms yellow (Y) print images, printing subsystem 33 forms magenta (M) print images, and printing subsystem 34 forms cyan (C) print images.

Printing subsystem 35 can form a red, blue, green, or other fifth print image, including an image formed from a clear toner (e.g., one lacking pigment). The four subtractive primary colors, cyan, magenta, yellow, and black, can be combined in various combinations of subsets thereof to form a representative spectrum of colors. The color gamut of a printer (i.e., the range of colors that can be produced by the printer) is dependent upon the materials used and the process used for forming the colors. The fifth color can therefore be added to improve the color gamut. In addition to adding to the color gamut, the fifth color can also be a specialty color toner or spot color, such as for making proprietary logos or colors that cannot be produced with only CMYK colors (e.g., metallic, fluorescent, or pearlescent colors), or a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42a is shown after passing through printing subsystem 31. Print image 38 on receiver 42a includes unfused toner particles. Subsequent to transfer of the respective print images, overlaid in registration, one from each of the respective printing subsystems 31, 32, 33, 34, 35, receiver 42a is advanced to a fuser module 60 (i.e., a fusing or fixing assembly) to fuse the print image 38 to the receiver 42a. Transport web 81 transports the print-image-carrying receivers to the fuser module 60, which fixes the toner particles to the respective receivers, generally by the application of heat and pressure. The receivers are serially de-tacked from the transport web 81 to permit them to feed cleanly into the fuser module 60. The transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along the transport web 81 before or after cleaning station 86 in the direction of rotation of transport web 81.

In the illustrated embodiment, the fuser module 60 includes a heated fusing roller 62 and an opposing pressure roller 64 that form a fusing nip 66 therebetween. In an embodiment, fuser module 60 also includes a release fluid application substation 68 that applies release fluid, e.g., silicone oil, to fusing roller 62. Alternatively, wax-containing toner can be used without applying release fluid to the fusing roller 62. Other embodiments of fusers, both contact and non-contact, can be employed. For example, solvent fixing uses solvents to soften the toner particles so they bond with the receiver. Photoflash fusing uses short bursts of high-frequency electromagnetic radiation (e.g., ultraviolet light) to melt the toner. Radiant fixing uses lower-frequency electromagnetic radiation (e.g., infrared light) to more slowly melt the toner. Microwave fixing uses electromagnetic radiation in the microwave range to heat the receivers (primarily), thereby causing the toner particles to melt by heat conduction, so that the toner is fixed to the receiver.

The fused receivers (e.g., receiver 42b carrying fused image 39) are transported in series from the fuser module 60 along a path either to an output tray 69, or back to printing subsystems 31, 32, 33, 34, 35 to form an image on the backside of the receiver (i.e., to form a duplex print). Receivers 42b can also be transported to any suitable output accessory. For example, an auxiliary fuser or glossing assembly can provide a clear-toner overcoat. Printer 100 can also include multiple fuser modules 60 to support applications such as overprinting, as known in the art.

In various embodiments, between the fuser module 60 and the output tray 69, receiver 42b passes through a finisher 70. Finisher 70 performs various paper-handling operations, such as folding, stapling, saddle-stitching, collating, and binding.

Printer 100 includes main printer apparatus logic and control unit (LCU) 99, which receives input signals from various sensors associated with printer 100 and sends control signals to various components of printer 100. LCU 99 can include a microprocessor incorporating suitable look-up tables and control software executable by the LCU 99. It can also include a field-programmable gate array (FPGA), programmable logic device (PLD), programmable logic controller (PLC) (with a program in, e.g., ladder logic), microcontroller, or other digital control system. LCU 99 can include memory for storing control software and data. In some embodiments, sensors associated with the fuser module 60 provide appropriate signals to the LCU 99. In response to the sensor signals, the LCU 99 issues command and control signals that adjust the heat or pressure within fusing nip 66 and other operating parameters of fuser module 60. This permits printer 100 to print on receivers of various thicknesses and surface finishes, such as glossy or matte.

FIG. 2 shows additional details of printing subsystem 31, which is representative of printing subsystems 32, 33, 34, and 35 (FIG. 1). Photoreceptor 206 of imaging member 111 includes a photoconductive layer formed on an electrically conductive substrate. The photoconductive layer is an insulator in the substantial absence of light so that electric charges are retained on its surface. Upon exposure to light, the charge is dissipated. In various embodiments, photoreceptor 206 is part of, or disposed over, the surface of imaging member 111, which can be a plate, drum, or belt. Photoreceptors can include a homogeneous layer of a single material such as vitreous selenium or a composite layer containing a photoconductor and another material. Photoreceptors 206 can also contain multiple layers.

Charging subsystem 210 applies a uniform electrostatic charge to photoreceptor 206 of imaging member 111. In an exemplary embodiment, charging subsystem 210 includes a wire grid 213 having a selected voltage. Additional necessary components provided for control can be assembled about the various process elements of the respective printing subsystems. Meter 211 measures the uniform electrostatic charge provided by charging subsystem 210.

An exposure subsystem 220 is provided for selectively modulating the uniform electrostatic charge on photoreceptor 206 in an image-wise fashion by exposing photoreceptor 206 to electromagnetic radiation to form a latent electrostatic image. The uniformly-charged photoreceptor 206 is typically exposed to actinic radiation provided by selectively activating particular light sources in an LED array or a laser device outputting light directed onto photoreceptor 206. In embodiments using laser devices, a rotating polygon (not shown) is sometimes used to scan one or more laser beam(s) across the photoreceptor in the fast-scan direction. One pixel site is exposed at a time, and the intensity or duty cycle of the laser beam is varied at each dot site. In embodiments using an LED array, the array can include a plurality of LEDs arranged next to each other in a line, all dot sites in one row of dot sites on the photoreceptor can be selectively exposed simultaneously, and the intensity or duty cycle of each LED can be varied within a line exposure time to expose each pixel site in the row during that line exposure time.

As used herein, an "engine pixel" is the smallest addressable unit on photoreceptor 206 which the exposure subsystem 220 (e.g., the laser or the LED) can expose with a selected exposure different from the exposure of another engine pixel. Engine pixels can overlap (e.g., to increase addressability in the slow-scan direction). Each engine pixel has a corresponding engine pixel location, and the exposure applied to the engine pixel location is described by an engine pixel level.

The exposure subsystem 220 can be a write-white or write-black system. In a write-white or "charged-area-development" system, the exposure dissipates charge on areas of photoreceptor 206 to which toner should not adhere. Toner particles are charged to be attracted to the charge remaining on photoreceptor 206. The exposed areas therefore correspond to white areas of a printed page. In a write-black or "discharged-area development" system, the toner is charged to be attracted to a bias voltage applied to photoreceptor 206 and repelled from the charge on photoreceptor 206. Therefore, toner adheres to areas where the charge on photoreceptor 206 has been dissipated by exposure. The exposed areas therefore correspond to black areas of a printed page.

In the illustrated embodiment, meter 212 is provided to measure the post-exposure surface potential within a patch area of a latent image formed from time to time in a non-image area on photoreceptor 206. Other meters and components can also be included (not shown).

A development station 225 includes toning shell 226, which can be rotating or stationary, for applying toner of a selected color to the latent image on photoreceptor 206 to produce a developed image on photoreceptor 206 corresponding to the color of toner deposited at this printing subsystem 31. Development station 225 is electrically biased by a suitable respective voltage to develop the respective latent image, which voltage can be supplied by a power supply (not shown). Developer is provided to toning shell 226 by a supply system (not shown) such as a supply roller, auger, or belt. Toner is transferred by electrostatic forces from development station 225 to photoreceptor 206. These forces can include Coulombic forces between charged toner particles and the charged electrostatic latent image, and Lorentz forces on the charged toner particles due to the electric field produced by the bias voltages.

In some embodiments, the development station 225 employs a two-component developer that includes toner particles and magnetic carrier particles. The exemplary development station 225 includes a magnetic core 227 to cause the magnetic carrier particles near toning shell 226 to form a "magnetic brush," as known in the electrophotographic art. Magnetic core 227 can be stationary or rotating, and can rotate with a speed and direction the same as or different than the speed and direction of toning shell 226. Magnetic core 227 can be cylindrical or non-cylindrical, and can include a single magnet or a plurality of magnets or magnetic poles disposed around the circumference of magnetic core 227. Alternatively, magnetic core 227 can include an array of solenoids driven to provide a magnetic field of alternating direction. Magnetic core 227 preferably provides a magnetic field of varying magnitude and direction around the outer circumference of toning shell 226. Development station 225 can also employ a mono-component developer comprising toner, either magnetic or non-magnetic, without separate magnetic carrier particles.

Transfer subsystem 50 includes transfer backup member 113, and intermediate transfer member 112 for transferring the respective print image from photoreceptor 206 of imaging member 111 through a first transfer nip 201 to surface 216 of intermediate transfer member 112, and thence to a receiver 42 which receives respective toned print images 38 from each printing subsystem in superposition to form a composite image thereon. The print image 38 is, for example, a separation of one color, such as cyan. Receiver 42 is transported by transport web 81. Transfer to a receiver is effected by an electrical field provided to transfer backup member 113 by power source 240, which is controlled by LCU 99. Receiver 42 can be any object or surface onto which toner can be transferred from imaging member 111 by application of the electric field. In this example, receiver 42 is shown prior to entry into a second transfer nip 202, and receiver 42a is shown subsequent to transfer of the print image 38 onto receiver 42a.

In the illustrated embodiment, the toner image is transferred from the photoreceptor 206 to the intermediate transfer member 112, and from there to the receiver 42. Registration of the separate toner images is achieved by registering the separate toner images on the receiver 42, as is done with the NexPress 2100. In some embodiments, a single transfer member is used to sequentially transfer toner images from each color channel to the receiver 42. In other embodiments, the separate toner images can be transferred in register directly from the photoreceptor 206 in the respective printing subsystem 31, 32, 33, 34, 25 to the receiver 42 without using a transfer member. Either transfer process is suitable when practicing this invention. An alternative method of transferring toner images involves transferring the separate toner images, in register, to a transfer member and then transferring the registered image to a receiver.

LCU 99 sends control signals to the charging subsystem 210, the exposure subsystem 220, and the respective development station 225 of each printing subsystem 31, 32, 33, 34, 35 (FIG. 1), among other components. Each printing subsystem can also have its own respective controller (not shown) coupled to LCU 99.

Various finishing systems can be used to apply features such as protection, glossing, or binding to the printed images. The finishing system scan be implemented as an integral components of the printer 100, or can include one or more separate machines through which the printed images are fed after they are printed.

Figure 3:
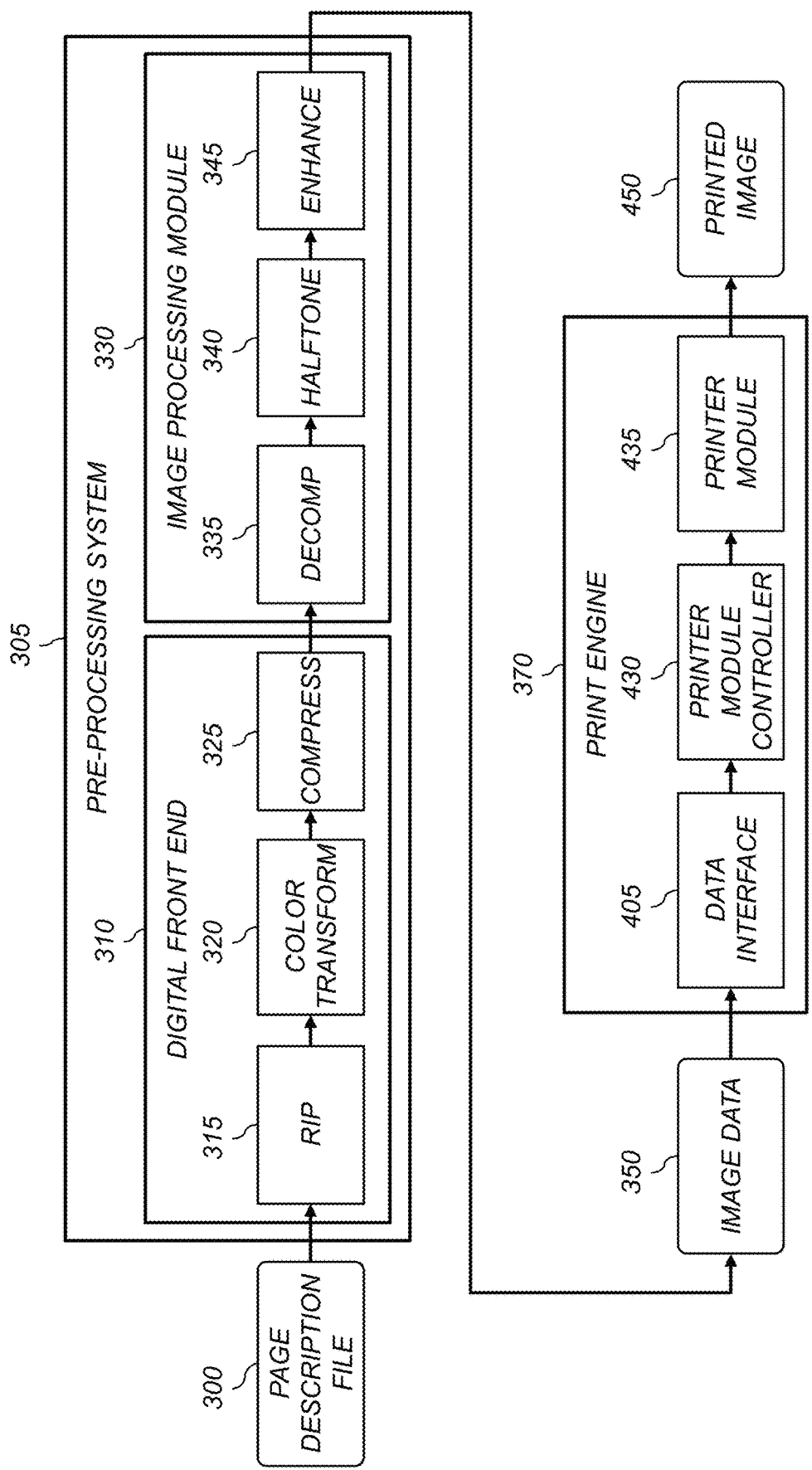
FIG. 3 shows a conventional processing path for producing a printed image using a pre-processing system couple to a print engine.

FIG. 3 shows a conventional processing path that can be used to produce a printed image 450 using a print engine 370. A pre-processing system 305 is used to process a page description file 300 to provide image data 350 that is in a form that is ready to be printed by the print engine 370. In an exemplary configuration, the pre-processing system 305 includes a digital front end (DFE) 310 and an image processing module 330. The pre-processing system 305 can be a part of printer 100 (FIG. 1), or may be a separate system which is remote from the printer 100. The DFE 310 and an image processing module 330 can each include one or more suitably-programmed computer or logic devices adapted to perform operations appropriate to provide the image data 350.

The DFE 310 receives page description files 300 which define the pages that are to be printed. The page description files 300 can be in any appropriate format (e.g., the well-known Postscript command file format or the PDF file format) that specifies the content of a page in terms of text, graphics and image objects. The image objects are typically provided by input devices such as scanners, digital cameras or computer generated graphics systems. The page description file 300 can also specify invisible content such as specifications of texture, gloss or protective coating patterns.

The DFE 310 rasterizes the page description file 300 into image bitmaps for the print engine to print. The DFE 310 can include various processors, such as a raster image processor (RIP) 315, a color transform processor 320 and a compression processor 325. It can also include other processors not shown in FIG. 3, such as an image positioning processor or an image storage processor. In some embodiments, the DFE 310 enables a human operator to set up parameters such as layout, font, color, media type or post-finishing options.

The RIP 315 rasterizes the objects in the page description file 300 into an image bitmap including an array of image pixels at an image resolution that is appropriate for the print engine 370. For text or graphics objects the RIP 315 will create the image bitmap based on the object definitions. For image objects, the RIP 315 will resample the image data to the desired image resolution.

The color transform processor 320 will transform the image data to the color space required by the print engine 370, providing color separations for each of the color channels (e.g., CMYK). For cases where the print engine 370 includes one or more additional colors (e.g., red, blue, green, gray or clear), the color transform processor 320 will also provide color separations for each of the additional color channels. The objects defined in the page description file 300 can be in any appropriate input color space such as sRGB, CIELAB, PCS LAB or CMYK. In some cases, different objects may be defined using different color spaces. The color transform processor 320 applies an appropriate color transform to convert the objects to the device-dependent color space of the print engine 370. Methods for creating such color transforms are well-known in the color management art, and any such method can be used in accordance with the present invention. Typically, the color transforms are defined using color management profiles that include multi-dimensional look-up tables. Input color profiles are used to define a relationship between the input color space and a profile connection space (PCS) defined for a color management system (e.g., the well-known ICC PCS associated with the ICC color management system). Output color profiles define a relationship between the PCS and the device-dependent output color space for the printer 100. The color transform processor 320 transforms the image data using the color management profiles. Typically, the output of the color transform processor 320 will be a set of color separations including an array of pixels for each of the color channels of the print engine 370 stored in memory buffers.

The processing applied in digital front end 310 can also include other operations not shown in FIG. 3. For example, in some configurations, the DFE 310 can apply the halo correction process described in commonly-assigned U.S. Pat. No. 9,147,232 (Kuo) entitled "Reducing halo artifacts in electrophotographic printing systems," which is incorporated herein by reference.

The image data provided by the digital front end 310 is sent to the image processing module 330 for further processing. In order to reduce the time needed to transmit the image data, a compressor processor 325 is typically used to compress the image data using an appropriate compression algorithm. In some cases, different compression algorithms can be applied to different portions of the image data. For example, a lossy compression algorithm (e.g., the well-known JPEG algorithm) can be applied to portions of the image data including image objects, and a lossless compression algorithm can be applied to portions of the image data including binary text and graphics objects. The compressed image values are then transmitted over a data link to the image processing module 330, where they are decompressed using a decompression processor 335 which applies corresponding decompression algorithms to the compressed image data.

A halftone processor 340 is used to apply a halftoning process to the image data. The halftone processor 340 can apply any appropriate halftoning process known in the art. Within the context of the present disclosure, halftoning processes are applied to a continuous-tone image to provide an image having a halftone dot structure appropriate for printing using the printer module 435. The output of the halftoning can be a binary image or a multi-level image. In an exemplary configuration, the halftone processor 340 applies the halftoning process described in commonly assigned U.S. Pat. No. 7,830,569 (Tai et al.), entitled "Multilevel halftone screen and sets thereof," which is incorporated herein by reference. For this halftoning process, a three-dimensional halftone screen is provided that includes a plurality of planes, each corresponding to one or more intensity levels of the input image data. Each plane defines a pattern of output exposure intensity values corresponding to the desired halftone pattern. The halftoned pixel values are multi-level values at the bit depth appropriate for the print engine 370.

The image enhancement processor 345 can apply a variety of image processing operations. For example, an image enhancement processor 345 can be used to apply various image enhancement operations. In some configurations, the image enhancement processor 345 can apply an algorithm that modifies the halftone process in edge regions of the image (see U.S. Pat. No. 7,079,281, entitled "Edge enhancement processor and method with adjustable threshold setting" and U.S. Pat. No. 7,079,287 entitled "Edge enhancement of gray level images" (both to Ng et al.), and both of which are incorporated herein by reference).

The pre-processing system 305 provides the image data 350 to the print engine 370, where it is printed to provide the printed image 450. The pre-processing system 305 can also provide various signals to the print engine 370 to control the timing at which the image data 350 is printed by the print engine 370. For example, the pre-processing system 305 can signal the print engine 370 to start printing when a sufficient number of lines of image data 350 have been processed and buffered to ensure that the pre-processing system 305 will be capable of keeping up with the rate at which the print engine 370 can print the image data 350.

A data interface 405 in the print engine 370 receives the data from the pre-processing system 305. The data interface 405 can use any type of communication protocol known in the art, such as standard Ethernet network connections. A printer module controller 430 controls the printer module 435 in accordance with the received image data 350. In an exemplary configuration, the printer module 435 can be the printer 100 of FIG. 1, which includes a plurality of individual electrophotographic printing subsystems 31, 32, 33, 34, 35 for each of the color channels. For example, the printer module controller 430 can provide appropriate control signals to activate light sources in the exposure subsystem 220 (FIG. 2) to expose the photoreceptor 206 with an exposure pattern. In some configurations, the printer module controller 430 can apply various image enhancement operations to the image data. For example, an algorithm can be applied to compensate for various sources of non-uniformity in the printer 100 (e.g., streaks formed in the charging subsystem 210, the exposure subsystem 220, the development station 225 or the fuser module 60. One such compensation algorithm is described in commonly-assigned U.S. Pat. No. 8,824,907 (Kuo et al.), entitled "Electrophotographic printing with column-dependent tonescale adjustment," which is incorporated herein by reference.

In the configuration of FIG. 3, the pre-processing system 305 is tightly coupled to the print engine 370 in that it must supply image data 350 in a state which is matched to the printer resolution and the halftoning state required for the printer module 435. As a result, when new versions of the print engine 370 having different printer resolutions or halftone state requirements are developed, it has been necessary to also provide an updated version of the pre-processing system 305 that provides image data 350 in an appropriate state. This has the disadvantage that customers are required to upgrade both the pre-processing system 305 and the print engine 370 at the same time, both of which can have significant costs. The present invention addresses this problem by providing an improved print engine design which is compatible with a variety of different pre-processing systems.

Aspects of the present invention will now be described with reference to FIG. 4, which shows an improved print engine 400 that is adapted to produce printed images 450 from image data 350 provided by a plurality of different pre-processing systems 305 that are configured to supply image data 350 having different image resolutions and halftoning states. In an exemplary configuration, the pre-processing systems 305 are similar to that discussed with respect to FIG. 3, and includes a digital front end 310 and an image processing module 330. Details of the processing provided by the digital front end 310 and an image processing module 330 are not included in FIG. 4 for clarity, but will be analogous to the processing operations that were discussed with respect to FIG. 3. In this case, in addition to supplying image data 350, the pre-processing system 305 also supplies appropriate metadata 360 that provides an indication of the state of the image data 350. In particular, the metadata 360 provides an indication of the image resolution and the halftoning state of the image data 350.

In an exemplary configuration, the metadata 360 includes an image resolution parameter that provides an indication of an image resolution of the image data 350 provided by the pre-processing system 305 and a halftone state parameter that provides an indication of a halftoning state of the image data provided by the pre-processing system 305.

The image resolution parameter (R) can take any appropriate form that conveys information about the image resolution of the image data 350. In some embodiments, the image resolution parameter can be an integer specifying the spatial resolution in appropriate units such as dots/inch (dpi) (e.g., R=600 for 600 dpi and R=1200 for 1200 dpi). In other embodiments, the image resolution parameter can be an index to an enumerated list of allowable spatial resolutions (e.g., R=0 for 600 dpi and R=1 for 1200 dpi).

The halftone state parameter (H) can also take any appropriate form. In some embodiments, the halftone state parameter can be a Boolean variable indicating whether or not a halftoning process was applied in the pre-processing system 305 such that the image data 350 is in a halftoned state (e.g., H=FALSE indicates that a halftoning process was not applied so that the image data 350 is in a continuous tone state, and H=TRUE indicates that a halftoning process was applied sot that the image data 350 is in a halftoned state.) In other embodiments, when the pre-processing system 305 applied a halftoning process, the halftone state parameter can also convey additional information about the type of halftoning process that was applied. For example, the halftone state parameter can be an integer variable, where H=0 indicates that no halftoning process was applied, and other integer values represent an index to an enumerated list of available halftoning states (e.g., different screen frequency/angle/dot shape combinations).

The metadata 360 can also specify other relevant pieces of information. For example, for the case where the image data 350 is in a continuous tone state such that a halftone processor 425 in the print engine 400 will be required to apply a halftoning operation, the metadata 360 can also include one or more halftoning parameters that are used by the halftone processor 425 to control the halftoning operation. In some embodiments, the halftoning parameters can include a screen angle parameter, a screen frequency parameter, or a screen type parameter. In other embodiments, the halftoning parameters can include a halftone configuration index that is used to select one of a predefined set of halftone algorithm configurations.

The print engine 400 receives the image data 350 and the metadata 360 using an appropriate data interface 405 (e.g., an Ethernet interface). The print engine includes a metadata interpreter 410 that analyzes the metadata 360 to provide appropriate control signals 415 that are used to control a resolution modification processor 420 and a halftone processor 425, which are used to process the image data 350 to provide processed image data 428, which is in an appropriate state to be printed by the printer module 435. Printer module controller 430 then controls the printer module 435 to print the processed image data 428 to produce the printed image 450 in an analogous manner to that which was discussed relative to FIG. 3.

Figure 4:
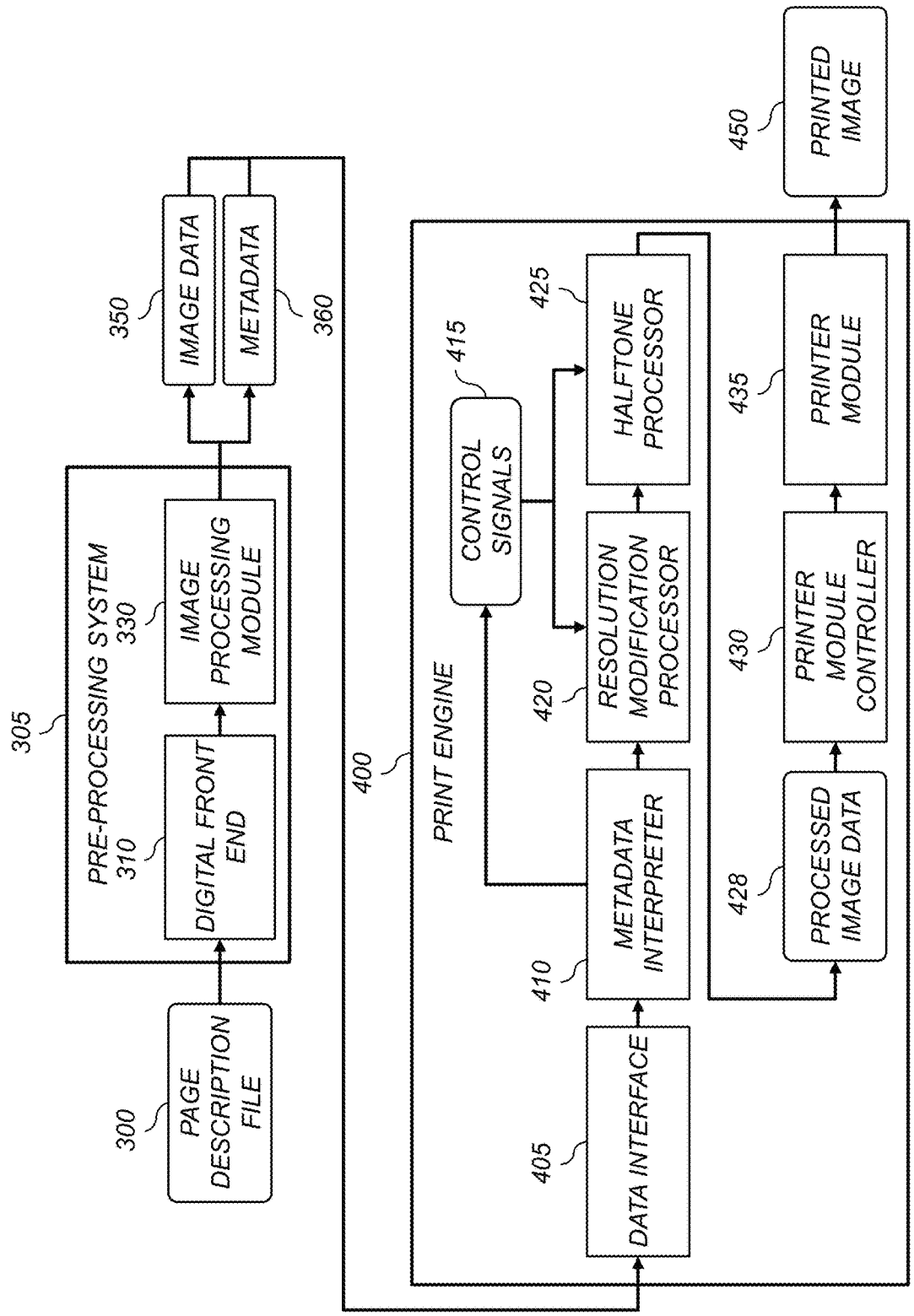
FIG. 4 shows an processing path including a print engine that is adapted to produce printed images from image data supplied by a variety of different pre-processing systems.
Figure 5:
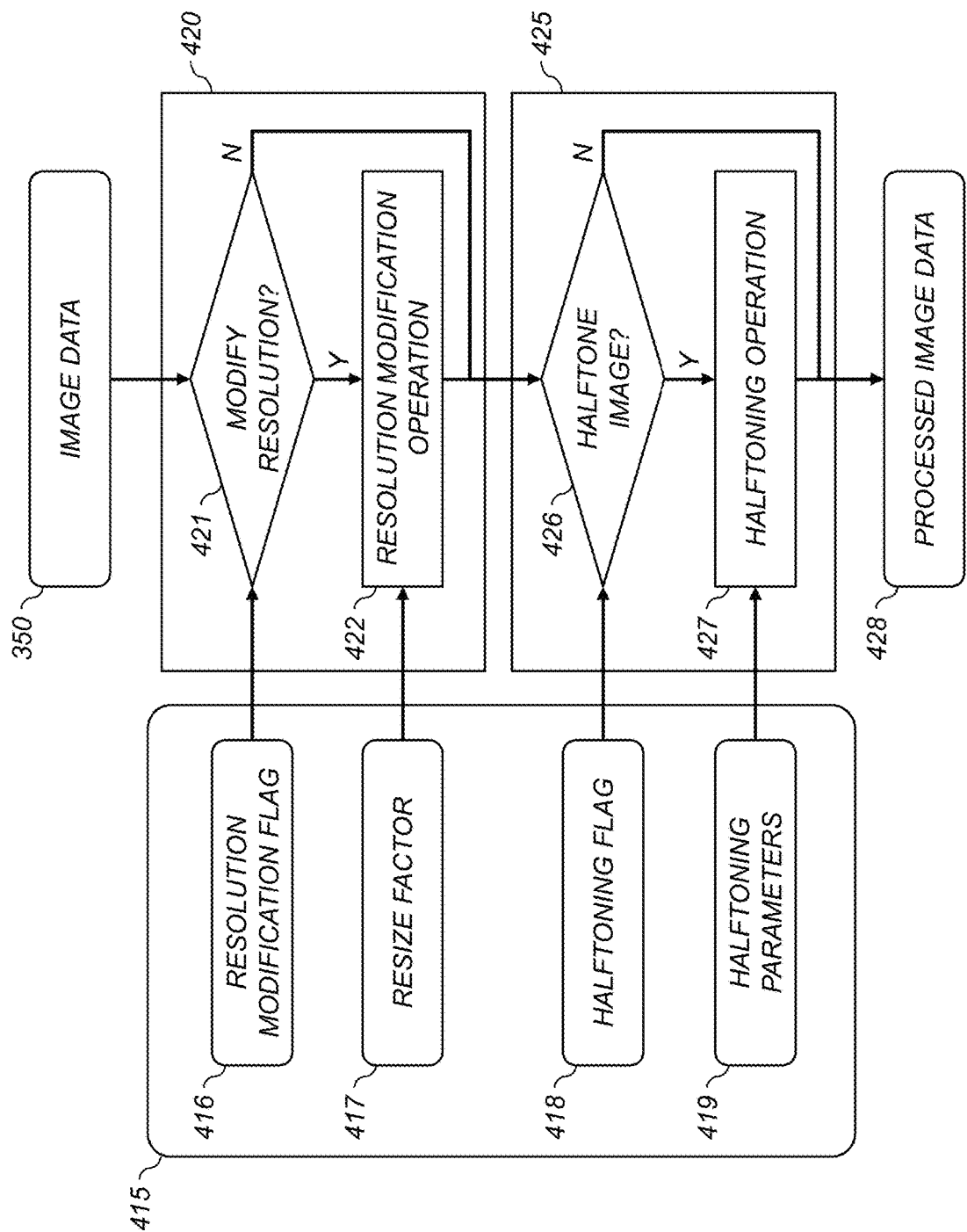
FIG. 5 shows additional details for the resolution modification processor and the halftone processor of FIG. 4.

FIG. 5 shows additional details of the resolution modification processor 420 and the halftone processor 425 of FIG. 4 according to an exemplary configuration. In this example, the control signals 415 provided by the metadata interpreter 410 (FIG. 4) in response to analyzing the metadata 360 (FIG. 4) include a resolution modification flag 416, a resize factor 417, a halftoning flag 418 and halftoning parameters 419.

The resolution modification flag 416 provides an indication of whether a resolution modification must be performed. In an exemplary configuration the resolution modification flag 416 is a Boolean variable that would be set to FALSE if no resolution modification is required (i.e., if the image resolution of the image data 350 matches the printer resolution of the printer module 435), and would be set to TRUE of a resolution modification is required.

The halftoning flag 418 provides an indication of whether a halftoning operation is required. In an exemplary configuration the halftone flag 418 is a Boolean variable that would be set to FALSE if no halftoning operation is required (i.e., if the image data 350 is in a halftoning state that is appropriate for the printer module 435), and would be set to TRUE if a halftoning operation must be applied to the image data 350 before it is ready to be printed.

The resolution modification processor 420 applies modify resolution test 421 to determine whether a resolution modification should be performed responsive to the resolution modification flag 416. If a resolution modification is required, a resolution modification operation 422 is performed. In some configurations, the metadata interpreter 410 (FIG. 4) provides a resize factor 417 that specifies the amount of resizing that must be provided to adjust the resolution of the image data 350 to the resolution required by the printer module 435 (FIG. 4). In some configurations, the resize factor 417 is a variable specifying the ratio between the printer resolution and the image resolution. For example, if the image data 350 is at 600 dpi and the printer module 435 prints at 1200 dpi, the resize factor 417 would specify that a 2× resolution modification is required. In various configurations the resize factor 417 could be greater than 1.0 if the printer module 435 has a higher resolution than the image data 350, or it could be less than 1.0 if the printer module 435 has a lower resolution than the image data 350.

In an exemplary configuration, if the image resolution of the image data 350 supplied by the pre-processing system 305 is an integer fraction of the printer resolution of the printer module 435 so that the resize factor 417 is a positive integer, the resolution modification operation 422 performs the resolution modification by performing a pixel replication process. For example, each 600 dpi image pixel in the image data 350 would be replaced with a 2×2 array of 1200 dpi image pixels, each having the same pixel value. In other configurations, an appropriate interpolation process can be used by the resolution modification operation 422 (e.g., nearest neighbor interpolation, bi-linear interpolation or bi-cubic interpolation). The use of an interpolation algorithm is particularly useful of the resize factor is not an integer.

For cases where the resize factor is less than 1.0, the resolution modification operation 422 can perform appropriate averaging operations to avoid aliasing artifacts. For example, if the resize factor 417 is 0.5, then 2×2 blocks of image pixels in the image data 350 can be averaged together to provide the new resolution. In other configurations, the resolution modification operation 422 can apply a low-pass filter operation followed by a resampling operation.

The halftone processor 425 applies halftone image test 426 to determine whether a halftoning operation should be performed responsive to the halftoning flag 418. If a halftoning operation is required (e.g., if the image data 350 is in a continuous-tone state), a halftoning operation 427 is performed. In some configurations, the metadata interpreter 410 (FIG. 4) provides one or more halftoning parameters 419 that are used to control the halftoning operation. As discussed earlier, the halftoning parameters 419 can include a screen angle parameter, a screen frequency parameter, or a screen type parameter. In other embodiments, the halftoning parameters 419 can include a halftone configuration index that is used to select one of a predefined set of halftone algorithm configurations The halftoning operation applied by the halftone processor 425 can use any appropriate halftoning algorithm known in the art. In some embodiments, any of the halftoning algorithms described in commonly-assigned U.S. Pat. No. 7,218,420 (Tai et al.), entitled "Gray level halftone processing," commonly-assigned U.S. Pat. No. 7,626,730 (Tai et al.), entitled "Method of making a multilevel halftone screen," and commonly-assigned U.S. Pat. No. 7,830,569 (Tai et al.), entitled "Multilevel halftone screen and sets thereof," each of which are incorporated herein by reference, can be used. Such halftoning algorithms typically involve defining look-up tables defining the halftone dot shape as a function of position for a tile of pixels. Different look-up tables can be specified to produce different halftone dot patterns. For example, different look-up tables can be specified for different screen angles, screen frequencies and dot shapes. In this case, the halftoning parameters 419 can include a halftone configuration index that selects which look-up table should be used to halftone the image data 350.

Consider the case where the printer module 435 prints halftoned image data at 1200 dpi, but where different pre-processing systems 305 and configurations can be used to supply image data 350 at either 600 dpi or 1200 dpi, and in either a halftoned state or a continuous tone state. In this case, there will be four different combinations of the image resolution parameters and the halftone state parameters that the print engine must deal with.

1. The image resolution parameter indicates that image data 350 is 600 dpi, and the halftone state parameter indicates that the image data 350 is in a halftoned state. In this case, the print engine 400 would print the image data 350 in a mode that emulates a 600 dpi printer. The resolution modification processor 420 would be used to modify the image resolution to provide the 1200 dpi data required by the printer module 435. In an exemplary embodiment, each 600 dpi image pixel is replicated to provide a 2×2 array of 1200 dpi image pixels. Since the image data is already in a halftoned state, the halftone operation 427 would be bypassed.

2. The image resolution parameter indicates that the image data 350 is 600 dpi, and the halftone state parameter indicates that the image data 350 is in a continuous-tone state. In this case, the resolution modification processor 420 would be used to modify the image resolution to provide the 1200 dpi data appropriate for the printer module 435, and the halftone processor 425 would apply a halftoning operation 427 to the 1200 dpi image data in accordance with the halftoning parameters 419.

3. The image resolution parameter indicates that the image data 350 is 1200 dpi, and the halftone state parameter indicates that the image data 350 is in a halftoned state. In this case, the image data 350 is already in a state that is ready for printing by the printer module 435, therefore the resolution modification operation 422 and the halftoning operation 427 would both be bypassed.

4. The image resolution parameter indicates that image data 350 is 1200 dpi, and the halftone state parameter indicates that the image data 350 is in a continuous-tone state. In this case, since the image data is already at 1200 dpi so that the resolution modification operation 422 would be bypassed, and the halftone processor 425 would apply a halftoning operation 427 to the 1200 dpi image data in accordance with the halftoning parameters 419.

In a preferred configuration, the halftone processor 425 uses a computational halftone process to compute halftoned pixel values using a defined set of calculations. The calculations can be performed in a processor (e.g., a field-programmable gate array) located in the print engine 370. For example, the halftone processor 425 can determine halftoned pixel values E(x,y) for each (x,y) pixel position in the image data 350 using the process outlined in FIG. 6. In summary, the process is used to determine halftoned pixels 545 (E(x,y)) using the following relationship:

$$E(x, y) = \frac{1}{N \times N} \sum_{i=1}^{N} \sum_{j=1}^{N} H(u_i, v_j) \qquad (1)$$

where the halftoned pixel values E(x,y) define the pattern of exposure values to be provided to the photoreceptor 206 (FIG. 2) by the exposure subsystem 220 (FIG. 2). The halftoned pixel values E(x,y) are determined by averaging halftoned pixel values computed using a halftone dot function 530 (H(u,v)) for an array of high-resolution dot coordinates 520 ($u_i,v_j$) determined by performing a coordinate transformation to an N×N array of high-resolution printer coordinates 510 ($x_i,y_j$). N is a positive integer greater than one. Preferably, N≥3. In an exemplary configuration, N=5. In a preferred embodiment, the halftone dot function 530 defines a center-growing dot pattern. However, other types of dot patterns can also be used.

One skilled in the art will recognize that Eq. (1) has the effect of computing high-resolution halftoned pixel values at a higher resolution than the native printer resolution, and then averaging them down to determine the final halftoned pixel values E(x,y) at the printer resolution. In this case, high-resolution halftoned pixel values 535 ($H(u_i, v_j)$) are determined for an N×N array of sub-pixels for each input pixel, such that the high-resolution halftoned exposure values are determined at a resolution that is N× greater than the printer resolution.

For each input pixel 500 (C(x,y)) of the image data 350, a define high-resolution printer coordinates step 505 is used to define an array of high-resolution printer coordinates 510 ($x_i, y_j$) by sub-sampling the printer coordinates at a higher resolution than the printer resolution in a neighborhood around the (x,y) pixel position.

In an exemplary configuration, the array of high-resolution printer coordinates 510 can be determined using the following relationship:

$$x_i = x + i/N$$

$$y_j = y + j/N \quad (2)$$

where (x,y) are the pixel coordinates of the input pixel 500 in the printer coordinate system, and where i and j are array indices which range from 0 to N−1. One skilled in the art will recognize that this has the effect of defining an N×N array of high-resolution printer coordinates 510 in a neighborhood of the (x,y) pixel coordinate by defining a set of intermediate positions between the pixel coordinates of the image data 350. The resulting high-resolution printer coordinates 510 are sampled at a higher spatial resolution than the printer resolution associated with the image data 350.

A determine high-resolution dot coordinates step 515 is used to determine a corresponding array of high-resolution dot coordinates 520 ($u_i, v_j$) by applying an appropriate coordinate transformation to the p high-resolution printer coordinates 510 ($x_i, y_j$). The coordinate transformation which will be a function of the screen angle and screen frequency of the halftone pattern. In an exemplary embodiment, the coordinate transformation is performed using the following equation:

$$\begin{bmatrix} u_i \\ v_j \end{bmatrix} = \begin{bmatrix} 1/\alpha & 0 \\ 0 & 1/\alpha \end{bmatrix} \begin{bmatrix} \cos(\theta) & \sin(\theta) \\ -\sin(\theta) & \cos(\theta) \end{bmatrix} \begin{bmatrix} x_i \\ y_j \end{bmatrix} \quad (3)$$

where θ=screen angle, and $$\alpha = f_p / f_H \quad (4)$$

where $f_h$ is the halftone screen frequency (lines/inch), and $f_p$ is the printer resolution (dots/inch). The printer resolution can also be referred to as pixel frequency of the printer. The first matrix in Eq. (3) scales the printer coordinates in accordance with the ratio α, and the second matrix in Eq. (3) rotates the printer coordinates in accordance with the screen angle θ.

A determine high-resolution halftoned pixel values step 525 is used to determine a set of high-resolution halftoned pixel values 535 ($H(u_i, v_j)$) using halftone dot function 530 corresponding to the array of high-resolution dot coordinates 520 ($u_i, v_j$). The halftone dot function 530 defines the desired halftone dot value (e.g., the exposure level) as a function of the input image code value C(x,y) and the relative position within the halftone dot as specified by the high-resolution dot coordinates 520. In a preferred embodiment, the halftone dot function 530 is defined using following relationship:

$$H(u,v) = T_E(h(u,v)) \quad (5)$$

where h(u,v) is a halftone shape function specifying the halftone dot shape as a function of the dot coordinates (u,v), and $T_E(h)$ is an edge shape function. The edge shape function will generally vary as a function of code value C.

In an exemplary configuration, the halftone shape function h(u,v) can be computed using the following relationship:

$$h(u,v) = (u'^p + v'^p)^{1/p} \quad (6)$$

where p is a dot shape parameter (where p=1 produces diamond shaped dots and p=2 produces circular dots), and where u' and v' represent the relative position within the halftone cell, which can be calculated by:

$$u' = |(u - \text{Int}(u)) - 0.5|$$

$$v' = |(v - \text{Int}(v)) - 0.5| \quad (7)$$

where Int(●) is a function that returns the integer portion of a number. Eq. (7) takes advantage of the fact that the dot function will be symmetric around the center of the halftone cell having coordinates (0.5, 0.5).

Figure 7:
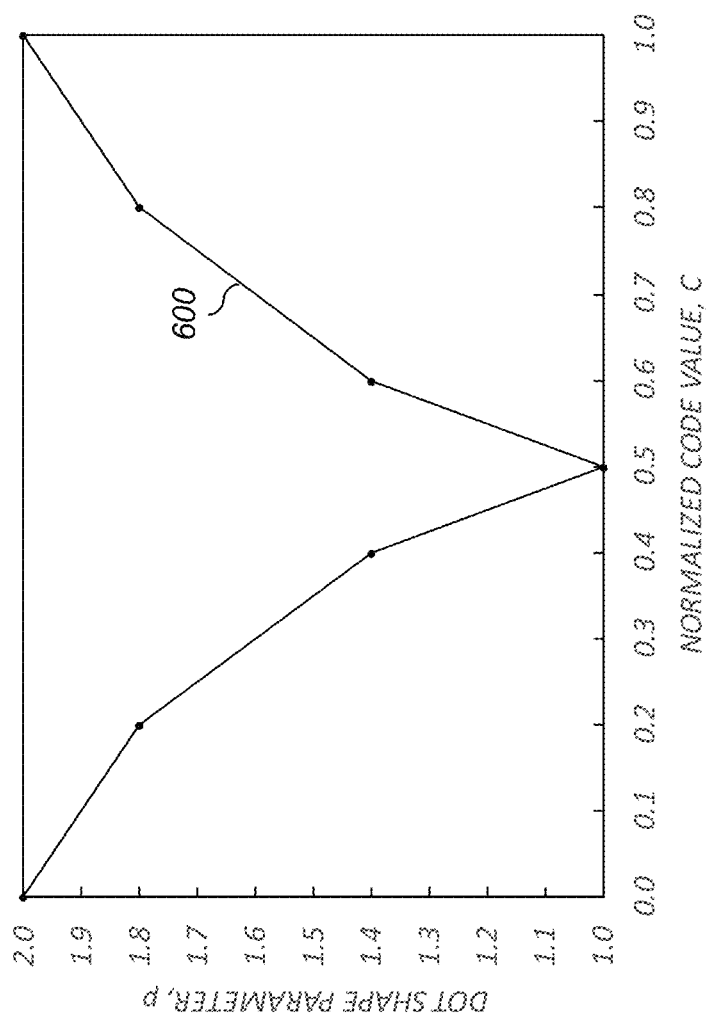
FIG. 7 illustrates a dot shape parameter function useful for the computational halftoning process of FIG. 6.

In some configurations, the value of the dot shape parameter p can be a function of the code value C so that the dot shape can be varied throughout the tonescale. FIG. 7 shows an example of a dot shape function 600 where the dot shape transitions from circular dots for low code values to diamond shaped dots in the mid-tones, and then back to circular dots for high code values. (The dot shape function 600 in FIG. 7 is specified in terms of a normalized code value, which can be computed by dividing an integer code value by the maximum code value.)

The edge shape function $T_E(h)$ maps the halftone dot shape values to corresponding halftoned pixel values, and can take any appropriate form. At one extreme, the edge shape function can take the form of a hard threshold. In other cases, the edge shape function can be used to implement a soft threshold such that the resulting halftone dots will have a soft edge. In an exemplary configuration, the edge shape function T(h) can take the following form:

$$T_E(h) = \begin{cases} 1; & h < T_L \\ 1 - \dfrac{h - T_L}{T_H - T_L} & T_L \leq h \leq T_H \\ 0; & h > T_H \end{cases} \quad (8)$$

where h is the halftone shape value, and $T_L$ and $T_H$ are low and high threshold values, respectfully. In an exemplary configuration, the low and high threshold values can be computed by:

$$T_L = T(C) - \Delta T(C)$$

$$T_H = T(C) + \Delta T(C) \quad (9)$$

where T(C) is a threshold value function which indicates where the halftone function h(u,v) should be thresholded to produce the desired tone scale, and ΔT(C) is an edge softness function which controls the softness of the edges of the halftone dots. Both T(C) and ΔT(C) are functions of the image code value (C).

The edge shape function $T_E(h)$ given in Eq. (8) includes a linear transition from the low threshold value $T_L$ to the high threshold value $T_H$. In alternate configurations, a non-linear function can be used such as a sigmoid function.

Figure 8:
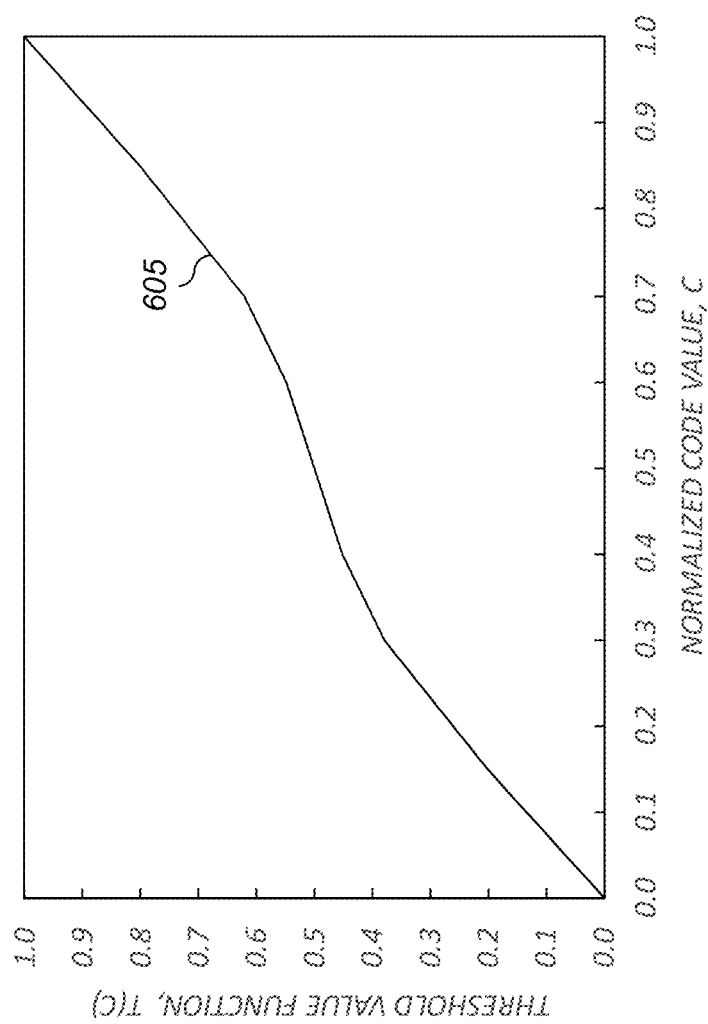
FIG. 8 illustrates a threshold value function useful for the computational halftoning process of FIG. 6.

The threshold value function T(C) can be used to account various attributes of the printer 100 (FIG. 1) to produce a desired tonescale relationship (e.g., density as a function of input code value C). For example, the threshold value function T(C) can be specified to compensate for dot gain characteristics of the print engine 400 (FIG. 4). In some embodiments, the threshold value function is determined using a calibration process that is performed during a system set-up process. FIG. 8 shows an example of a typical threshold value function 605 that produces a specified aim tonescale.

Figure 9:
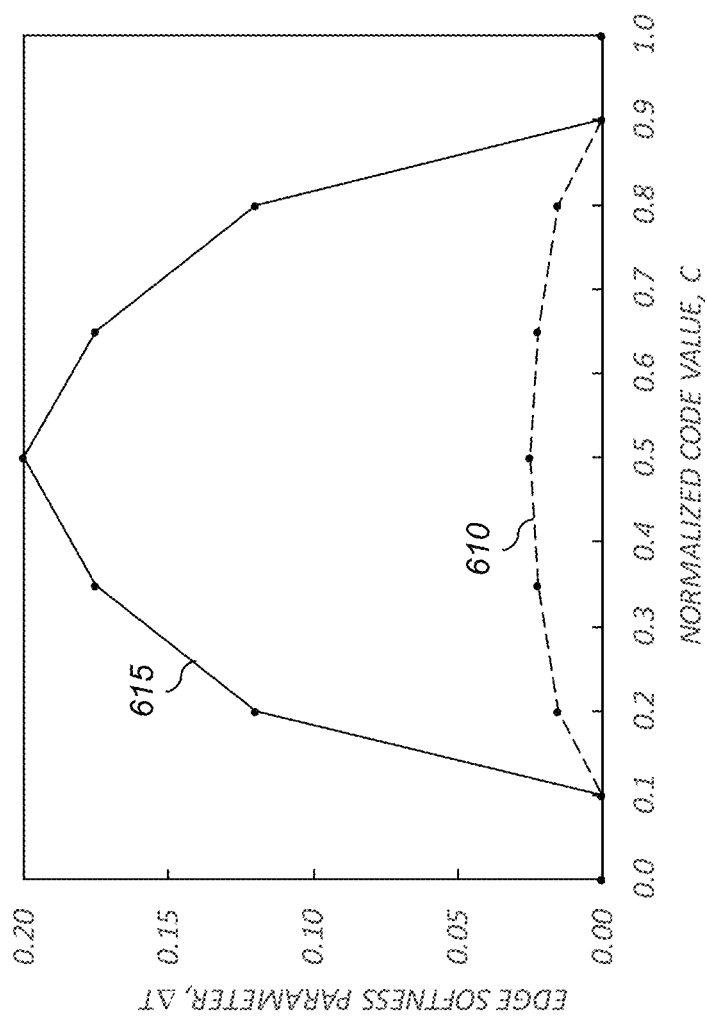
FIG. 9 illustrates an edge softness parameter function useful for the computational halftoning process of FIG. 6.

FIG. 9 shows examples of edge softness functions ΔT(C) that can be used to provide halftone dots having different levels of edge softness. Edge softness function 610 produces relatively hard edges on the halftone dots, and edge softness function 615 produces relatively soft edges on the halftone dots.

Figure 6:
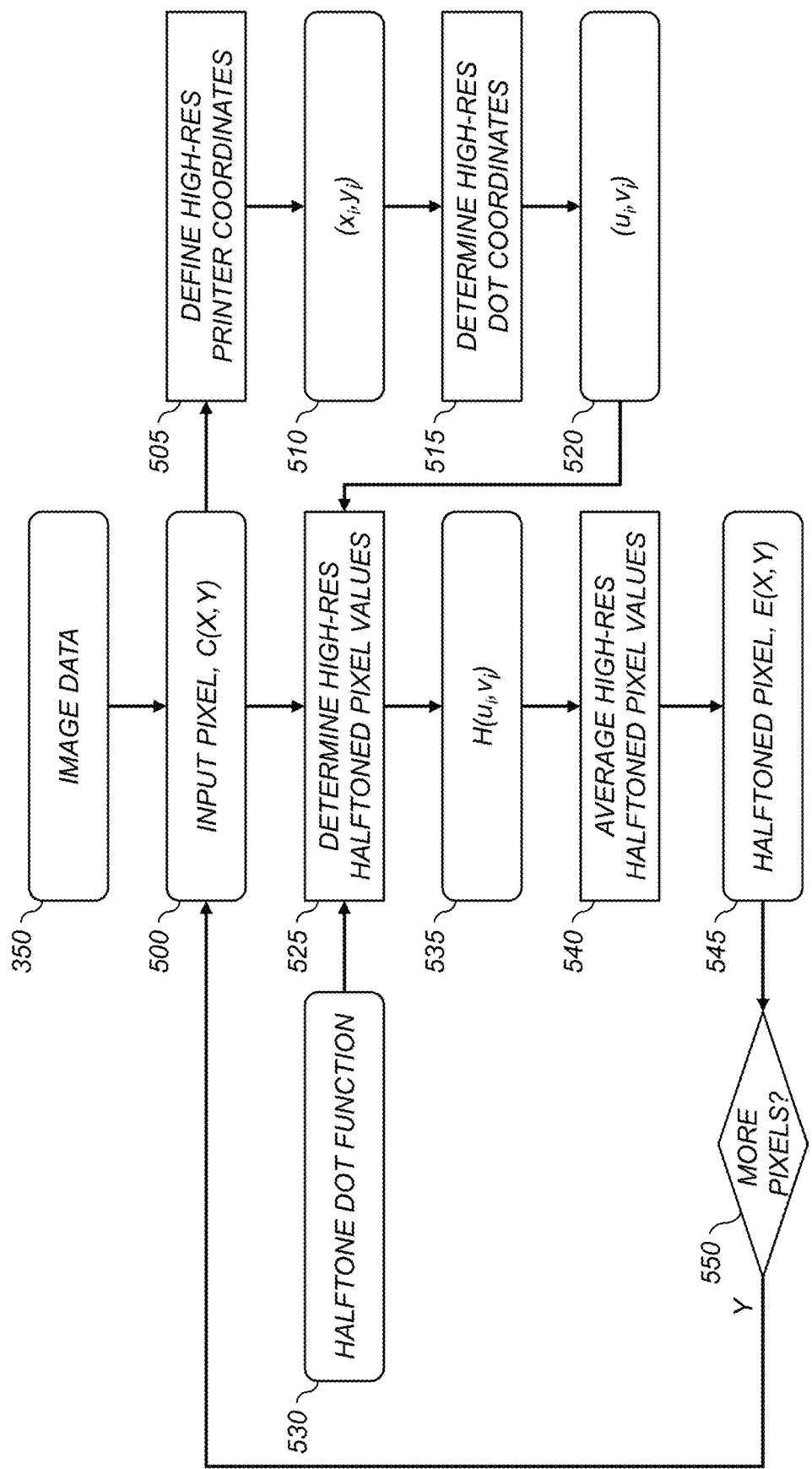
FIG. 6 shows a flow chart for a computational halftoning process that can be used for the halftoning operation of FIG. 5.

Returning to a discussion of FIG. 6, once the array of high-resolution halftoned pixel values 535 are determined, an average high-resolution halftoned pixel values step 540 is used to average the high-resolution halftoned pixel values 535 to determine the halftoned pixel value E(x,y) for the halftone pixel 545. The averaging process is reflected by the summation and normalization shown in Eq. (1).

A more pixels test 550 is then used to determine if all of the pixels in the image data 350 have been processed. If more pixels remain to be processed, the computational halftone process repeats the steps described above the next input pixel 500.

Figure 10:
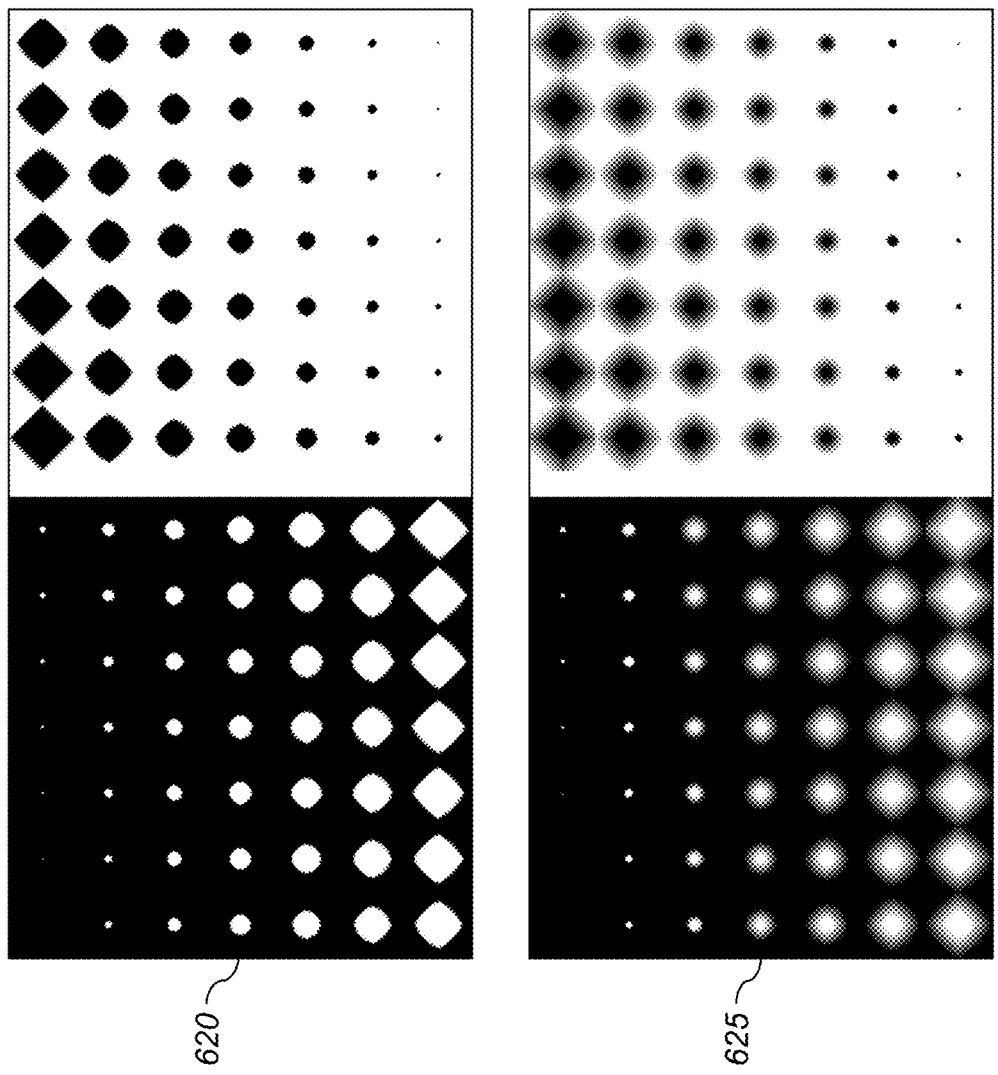
FIG. 10 illustrates example halftoned images formed using the computational halftoning process of FIG. 6.

FIG. 10 shows halftoned images 620, 625 determined using the method of FIG. 6 and the computations specified in Eqs. (1)-(9). The dot shape function 600 of FIG. 7 was used for both of the halftoned images 620, 625. Consequently, it can be seen that the circular dots are formed in the light and dark ends of the tonescale, and that diamond-shaped dots are formed in the mid-tone portion of the tonescale. The halftoned image 620 was formed using the edge softness function 610 of FIG. 8 so that the resulting halftone dots have relatively hard edges, and the halftoned image 625 was formed using the edge softness function 615 of FIG. 8 so that the resulting halftone dots have relatively hard edges.

It will be obvious to one skilled in the art that various methods can be used to improve the computational efficiency the computations described above with reference to FIG. 6. For example, various non-linear functions, such as the halftone shape function given in Eq. (6), can be implemented using look-up tables to avoid the need to perform calculations such as power functions which can be computationally expensive.

The use of the computational halftoning process described with reference to FIG. 6 provides a number of advantages. Most prior art halftoning processes are typically limited to processing 8-bit pixel values. For example, many halftoning operations utilize a set of look-up tables defining the halftone dot shape as a function of position for a tile of pixels. A different look-up table is often provided for each of 256 different input pixel levels. Since the computational halftoning process described herein uses a set of equations rather than a set of predefined halftone look-up tables to determine the halftoned pixel values, it can easily be used to process input pixels having any bit-depth. This be particularly important where calibration functions are applied to the image data 350 before applying the halftoning process. If the output of the calibration process is limited to an 8-bit value, it has been found that the resulting image can be susceptible to quantization artifacts in some cases. As a result, it is preferable that the calibrated image data have a bit-depth of at least 10 bits.

Another advantage of the computational halftoning process is that it can produce halftoned images having an arbitrary screen angle and screen frequency without producing aliasing artifacts. Halftoning operations that utilize look-up tables defining the halftone dot shape for a tile of pixels can support only certain screen angle/screen frequency combinations due to the tiling constraint.

Various artifacts have been observed in printers 100 where image regions that are intended to have uniform tone levels exhibit non-uniformities. These non-uniformities can result from a variety of different sources such as variations in the light output of the individual light sources in the printhead of the exposure subsystem 220 (FIG. 2), or non-uniformities in other system components such as the photoreceptor 206 (FIG. 2), the charging subsystem 210 (FIG. 2), the development station 225 (FIG. 2) or the fuser module 60 (FIG. 1). The magnitudes of the non-uniformity artifacts can generally be a function of the cross-track and in-track positions within the printed image, as well as the printed tone-level. Such non-uniformities can result in artifacts such as image streaks, where the amplitude of the streaks can depend on the tone-level of the image area. There can also be random components to the non-uniformity artifacts which can result in noise or "graininess" in the image.

Commonly-assigned U.S. Pat. No. 10,036,975 to Kuo et al., entitled "Determining a pulse timing function for a linear printhead," commonly-assigned U.S. Pat. No. 10,126,696 to Kuo et al., entitled "Adaptive printhead calibration process," and commonly-assigned U.S. Pat. No. 10,192,150 to Kuo et al., entitled "Print engine with print-mode-dependent pulse timing functions," each of which is incorporated herein by reference, describe aspects of a system and processes that can be used to reduce non-uniformity artifacts associated with printheads including a linear array of light sources. However, even when such processes are employed there can be residual non-uniformity artifacts that can be visible and objectionable in some applications. The present invention provides a method for further reducing tone-level non-uniformities in a digital printing system. In some embodiments, the method can be combined with other correction processes such as those described in the above-referenced patents.

Commonly-assigned U.S. Pat. No. 8,482,802 to Tai et al., entitled "Screened hardcopy reproduction apparatus with compensation," which is incorporated herein by reference describes a method for compensating for non-uniformity artifacts in an image. The method includes determining a correction value using a 2-D look-up table addressed by cross-track position and output pixel level. It has the disadvantage that the 2-D look-up table requires a large amount of memory for storage. Additionally, the corrections were applied to 8-bit/pixel image data, which was found to produce visible contouring artifacts in some applications.

Figure 11:
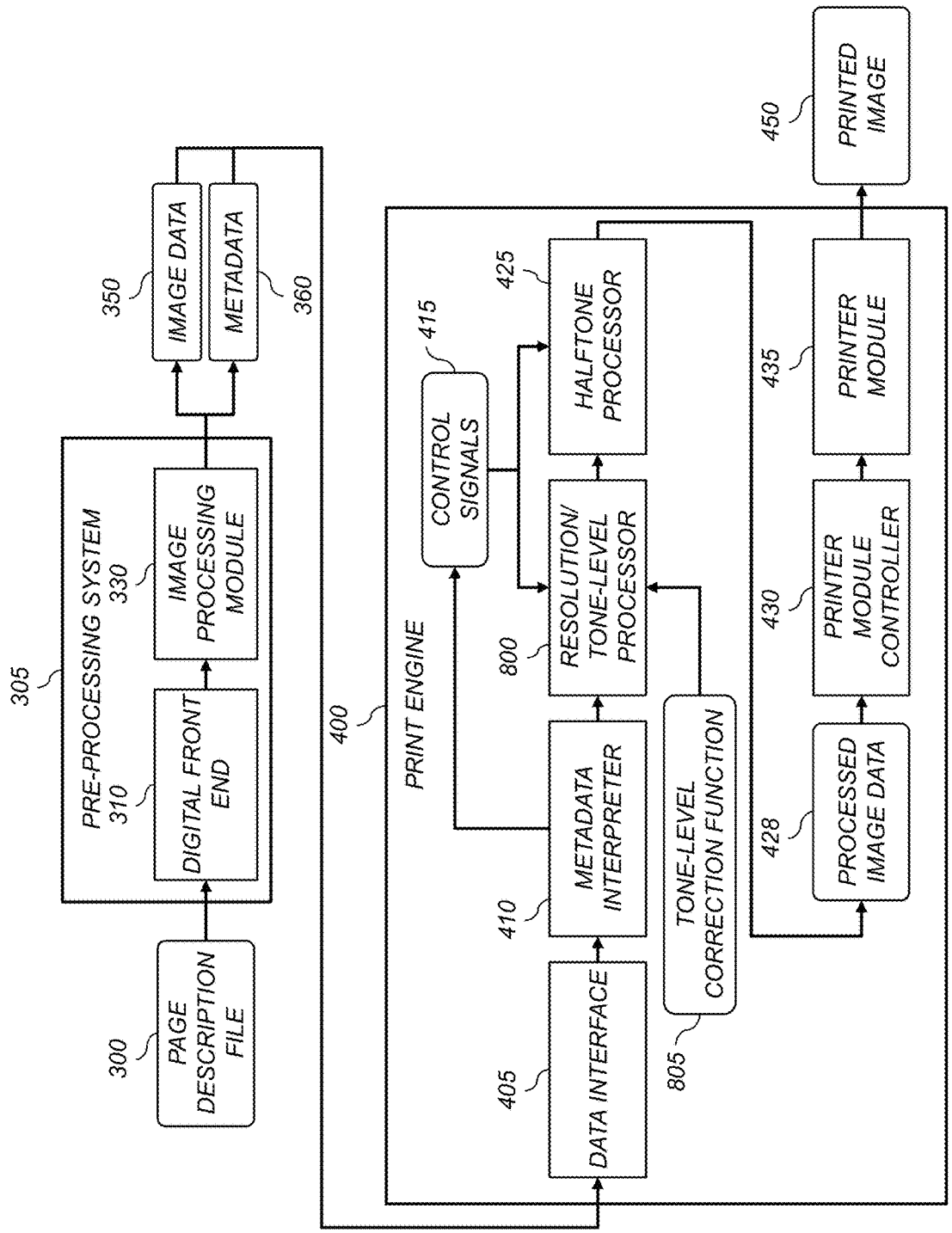
FIG. 11 shows an improved processing path including a print engine that is adapted to apply tone-level corrections that are a function of cross-track position and pixel value.

FIG. 11 shows an improved processing path including a print engine that is adapted to produce printed images incorporating tone-level corrections to correct for tone-level non-uniformities in accordance with an exemplary embodiment, where the characteristics of the tone-level non-uniformities vary with tone-level and cross-track position, and optionally with in-track position. The improved processing path is analogous to the processing path of FIG. 4 except that the resolution modification processor 420 has been replaced by a resolution/tone-level processor 800, which corrects the tone-level non-uniformities responsive to the tone-level correction function 805 in addition to performing any resolution modifications specified by the control signals 415.

Figure 12:
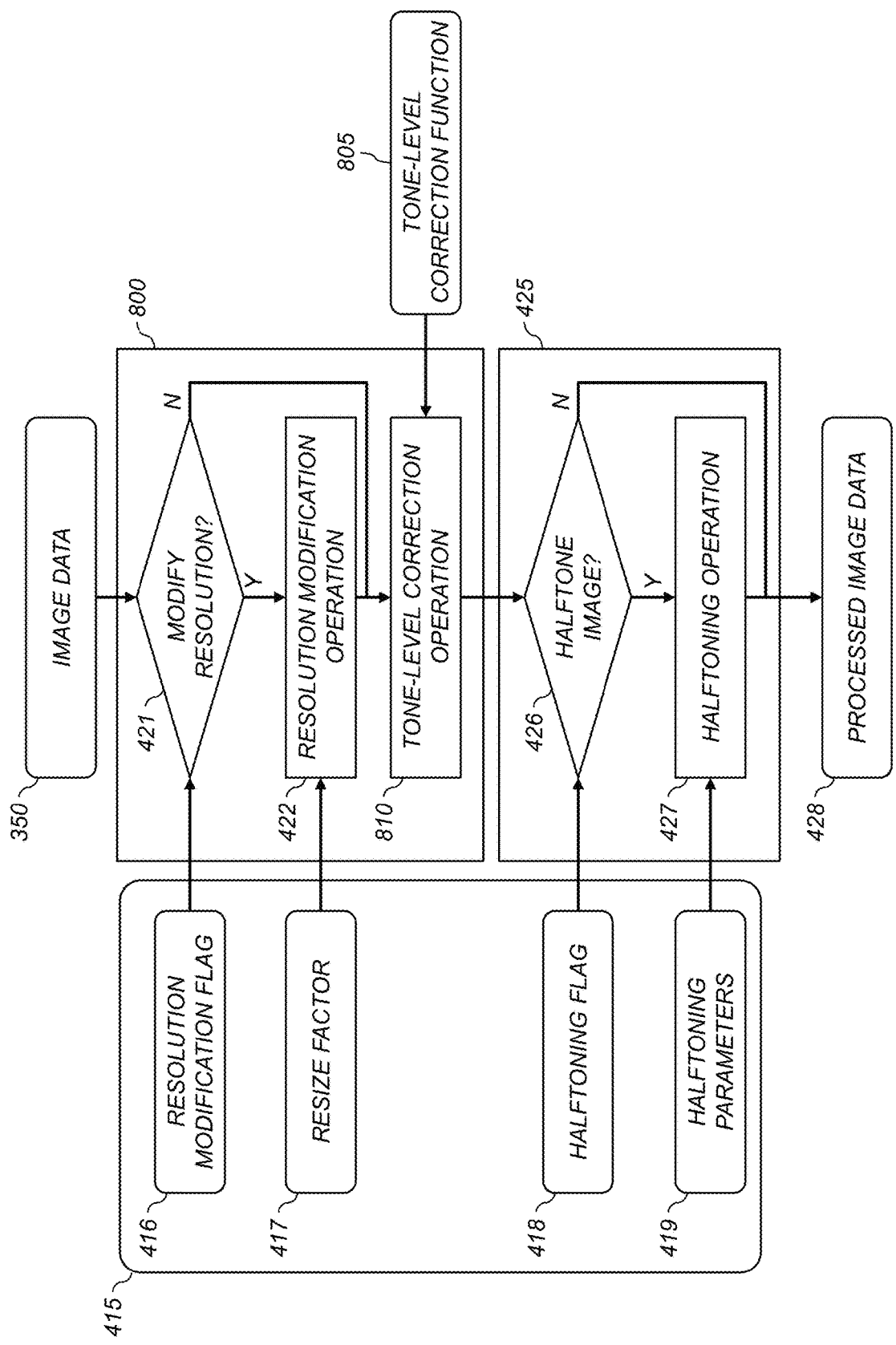
FIG. 12 shows additional details for the resolution/tone-level processor and the halftone processor of FIG. 11.

FIG. 12 shows additional details for the resolution/tone-level processor 800 and the halftone processor 425 of FIG. 11. This process is similar to that of FIG. 5 except for the addition of a tone-level correction operation 810. As discussed earlier, the resolution modification operation 422 involves resampling the image data 350 in accordance with a resize factor. The tone-level correction operation 810 involves modifying the tone-level of the image data as a function of the tone-level and the cross-track position, and optionally as a function of the in-track position. This operation is preferably applied to high-bit-depth image data in order to avoid the introduction of tone-level contouring artifacts. Preferably, the high-bit-depth image data is at least 10-bits/pixel image data, and more preferably it is at least 12-bits/pixel image data. In an exemplary embodiment, the image data 350 comes into the print engine 400 (FIG. 11) in an 8-bit/pixel format, but is converted to a 12-bit/pixel format before it is passed into the resolution/tone-level processor 800. The bit-depth conversion is typically performed with a look-up table, which may be linear or non-linear. The halftoning operation 427 is preferably applied to the same high-bit-depth image data in order to preserve the tone-level corrections without introducing tone-level contouring. The exemplary computational halftoning process described earlier with respect to FIG. 6 is well-suited to the present application.

Figure 13:
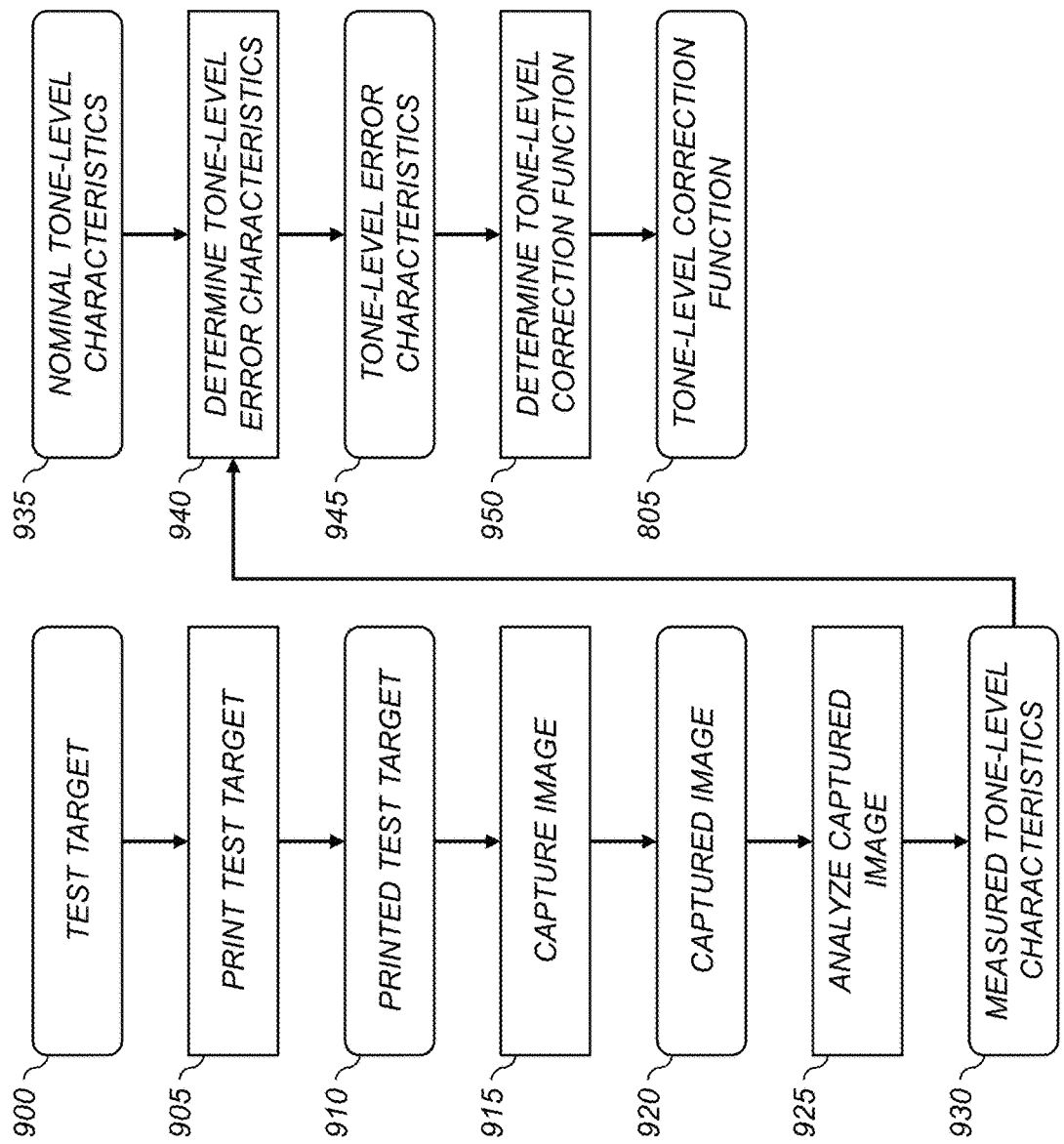
FIG. 13 shows a flowchart of a method for determining a tone-level correction function in accordance with an exemplary embodiment.
Figure 14:
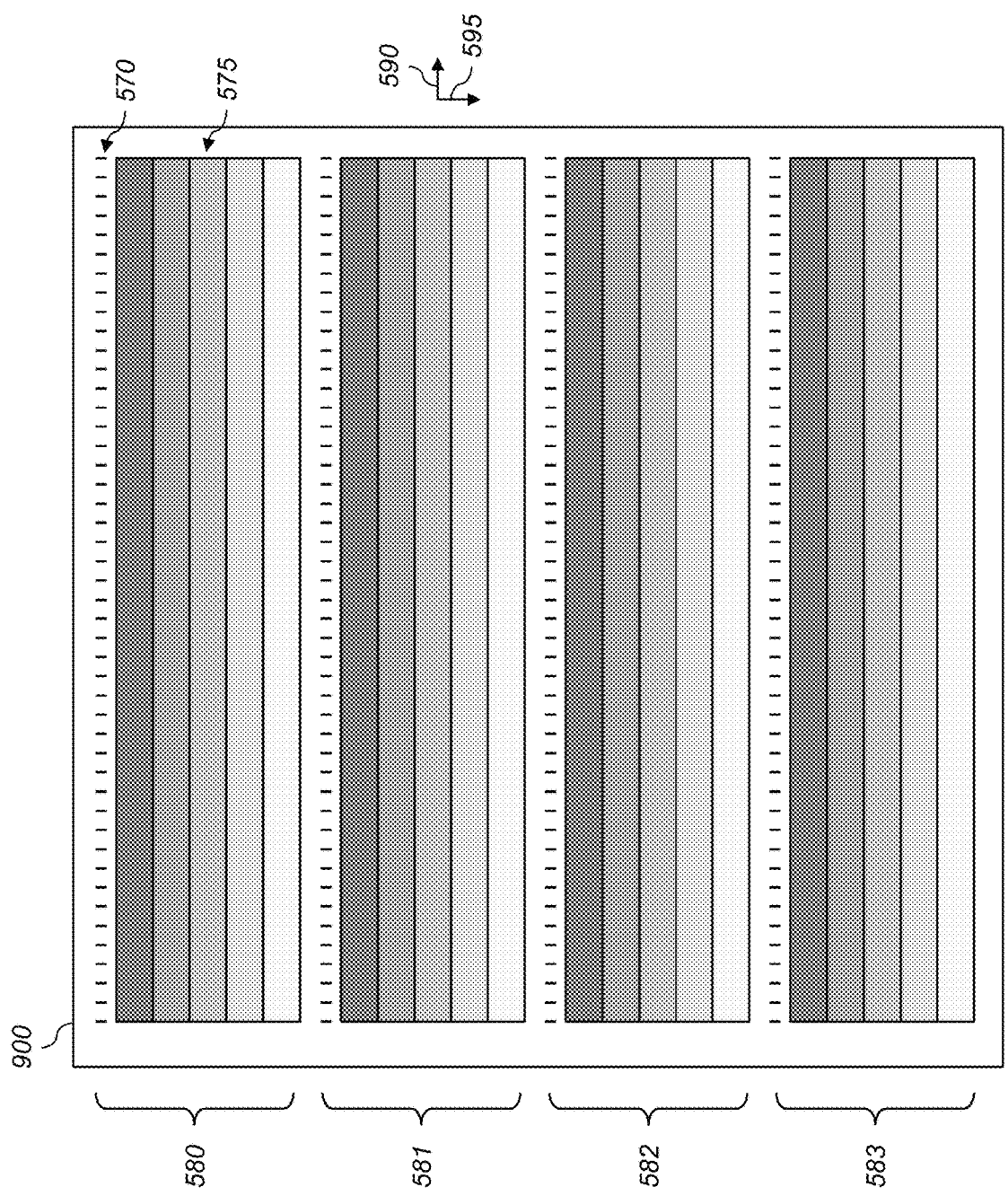
FIG. 14 illustrates an exemplary test target that includes uniform test patches useful for determining a tone-level correction function.

FIG. 13 shows a flowchart of an exemplary method for determining a tone-level correction function 805 that characterizes corrections that can be used to correct for tone-level non-uniformities that vary with tone-level and position within the image (i.e., cross-track position and optionally in-track position). The method includes providing digital image data for a test target 900. The test target 900 preferably includes a plurality of alignment marks 570 positioned at predefined cross-track positions as illustrated in the exemplary arrangement shown in FIG. 14. The alignment marks 570 are preferably distributed along the length of the printhead 475 which spans the test target 900 in the cross-track direction 590. The test target 900 also include uniform test patches 575 having code values that correspond to a set of different tone-levels. The uniform test patches 575 are useful for characterizing non-uniformities in the reproduced tone-level that vary with tone-level and position. In the exemplary arrangement of FIG. 14, the test target 900 includes a set of five uniform test patches 575 that span the test target 900 in the cross-track direction 590 for each of a plurality of different color channels. While a set of five uniform test patches 575 is shown for illustration purposes, different numbers of test patches can be used in practice. In a preferred embodiment, eight test patches are used in the set of uniform test patches 575. In the illustrated example, the test target includes first color channel image content 580 for a first color channel printed by a first printing subsystem 31 (FIG. 1), second color channel image content 581 for a second color channel printed by a second printing subsystem 32 (FIG. 1), third color channel image content 582 for a third color channel printed by a third printing subsystem 32 (FIG. 1), and fourth color channel image content 583 for a fourth color channel printed by a fourth printing subsystem 34 (FIG. 1). The image content for each color channel is provided in different image regions distributed in the in-track direction 595. The different color channels can be, for example, black, cyan, magenta and yellow. However, one skilled in the art will recognize that the color channels can use other colorants as well. In the illustrated configuration, each of different image regions includes a corresponding set of alignment marks 570 in addition to the set of uniform test patches 575. In other embodiments, rather than using a single test target 900 including uniform test patches 575 for all of the color channels, they can be included in a plurality of test targets 900 (e.g., one for each color channel). For cases where it is desirable to characterize tone-level non-uniformities that vary as a function of in-track position, each of the uniform test patches 575 can fill a single page in order to be able to assess the tone-level non-uniformities over the entire area of the image.

The alignment marks 570 are useful to determine the cross-track position within the test target. Preferably, at least ten alignment marks 570 are provided across the cross-track width of the test target 900 (i.e., along the length of the printhead 475) to enable the accurate determination of cross-track position. As described in commonly-assigned, co-pending U.S. patent application Ser. No. 16/417,731, entitled: "Correcting cross-track errors in a linear printhead", by Kuo et al., which is incorporated herein by reference, the alignment marks can also be used to characterize and correct for cross-track position errors.

Returning to a discussion of FIG. 13 a print test target step 905 is used to print the test target 900 to produce a printed test target 910. In a preferred embodiment, the printed test target 910 is formed on a piece of receiver 42 (FIG. 2) such as a sheet of paper. In other cases, the printed test target 910 can be an image transferred directly onto the transport web 81 rather than onto a sheet of receiver 42. In other embodiments, the printed test target 910 can correspond to an intermediate image formed on the surface of the imaging member 111 (i.e., the photoreceptor 206) or the surface 216 of an intermediate transfer member 112 (see FIG. 2).

A capture image step 915 is next used to capture a digital image of the printed test target 910 using a digital image capture system to provide a captured image 920. In an exemplary embodiment, the digital image capture system is a flatbed scanner external to the printer 100 which is used to scan the printed test target 910 formed on a receiver 42 after it has been completely printed and fused. In other embodiments, a digital image capture system (e.g., a digital scanner system or a digital camera system) which is integrated into the printer 100 can be used to capture an image of the printed test target 910 on the receiver 42 while the receiver 42 is traveling through the printer 100 (e.g., while it is being carried on the transport web 81), or before it has been transferred to the receiver 42 (e.g., on surface of the imaging member 111 or the intermediate transfer member 112).

Next, an analyze captured image step 925 is used to automatically analyze the captured image 920 to determine measured tone-levels 930. The measured tone-levels 930 characterize the tone-level of each of the uniform test patches 575 (FIG. 14) as a function of cross-track position, and optionally as a function of in-track position. For the case where the measured tone-levels are only determined as a function of the cross-track position, it will generally be desirable to average the tone-levels for a given cross-track position across a range of in-track positions within the uniform test patches 575. In some embodiments, the averaging process can be performed by applying a one-dimensional low-pass filter in the in-track direction and then taking a trace through the center of each uniform test patch 575. Since the printed test target 910 will generally be a halftoned image, the filtering process can also apply a two-dimensional de-screening filter to average out the halftoning pattern. This is particularly useful for the case of images halftoned with an AM screening algorithm. In some embodiments, the one-dimensional low-pass filter can be combined with the de-screening filter to form a single two-dimensional filter. Preferably, any skew in the captured image 920 can be characterized (e.g., by detecting the boundaries of the uniform test patches 575) and accounted for in the image analysis process. For example, the captured image 920 can be rotated to remove the skew.

Figure 15:
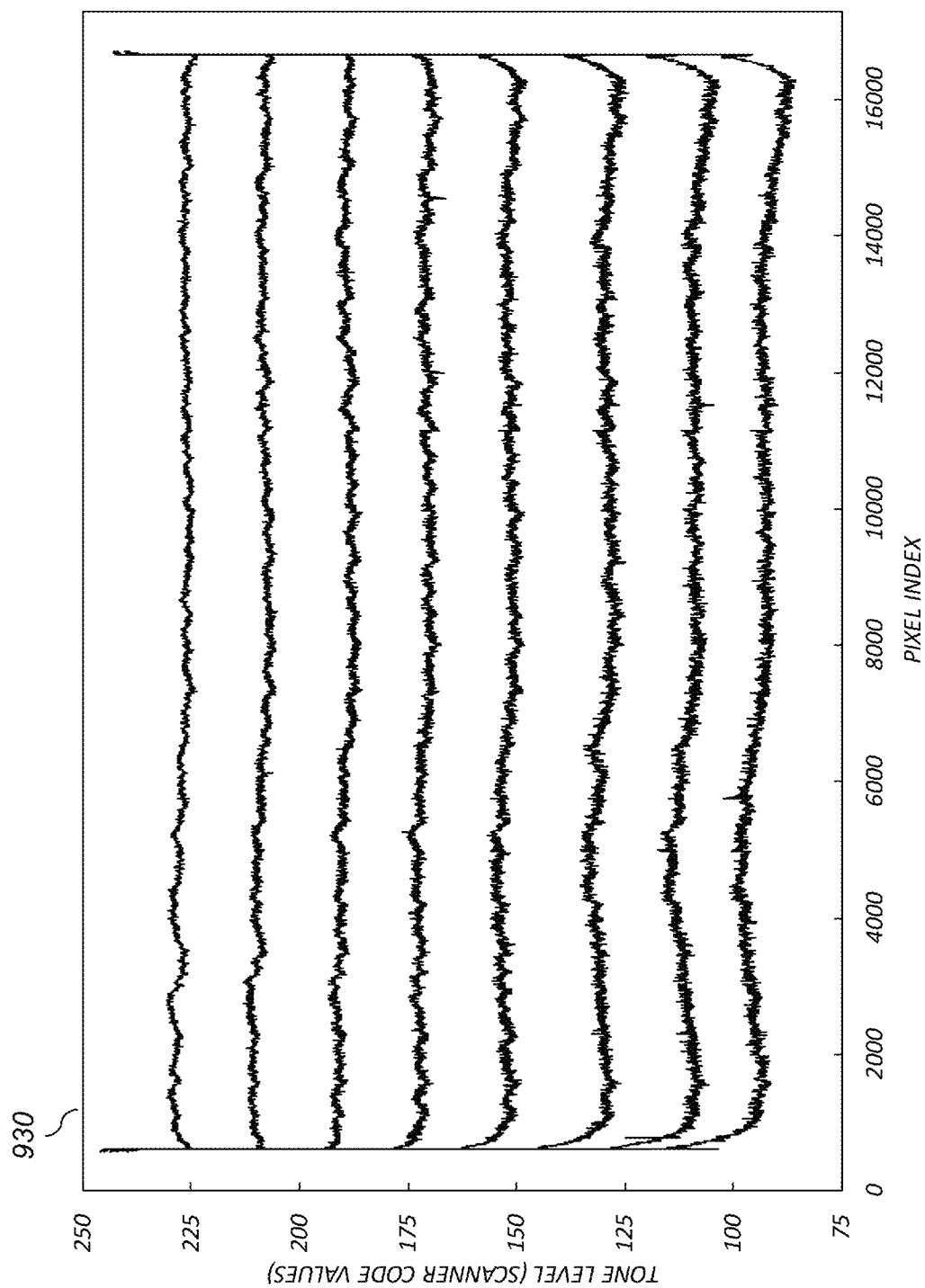
FIG. 15 is a graph showing exemplary tone-level measurements as a function of cross-track position for a set of uniform test patches.

FIG. 15 shows a set of exemplary measured tone-level characteristics 930. Each of the curves in FIG. 15 corresponds to a different uniform test patch 575. The y-axis in this graph is given in terms of scanner code values, which will be related to the overall tone-level. The image non-uniformities (e.g., streak artifacts) show up as localized deviations of the individual curves.

Returning to a discussion of FIG. 13, a determine tone-level errors step 940 is next used to determine tone level error characteristics 945 by comparing the measured tone-level characteristics 930 with corresponding nominal tone-level characteristics 935. In an exemplary embodiment, the nominal tone-level characteristics 935 correspond to the aim tone-level for each of the uniform test patches 575 in the test target 900 as measured by the image capture system. In this case, the tone-level error characteristics 945 will include any overall tone reproduction errors in addition to characterizing the tone-level non-uniformities. However, in practice the measured tone-level characteristics 930 will include non-uniformities originating from sources such as scanner non-uniformities or paper deformations. It can be difficult to separate these non-uniformities from the tone reproduction errors. Therefore, in a preferred embodiment, the nominal tone-level characteristics 935 are determined by smoothing the measured tone-level characteristics 930 to provide a slowly-varying curve that characterizes any scanner or paper non-uniformities. In this case, the measured tone-level error characteristics will exclude global tone reproduction errors and scanner non-uniformities and will only provide a representation of the localized tone-level non-uniformities. Any global tone reproduction errors can be accounted for in a separate tone scale calibration step. In an exemplary embodiment, the measured tone-level characteristics 930 are smoothed by fitting a spline function to the data from each patch. The stiffness of the spline can be adjusted to fit the slowly-varying scanner non-uniformities while removing the localized tone-level non-uniformities that correspond to the desired tone-level error characteristics 945.

In an exemplary embodiment, the tone-level error characteristics 945 are represented by a tone-level error function $\Delta_s(x,v)$:

$$\Delta_s(x,v) = I(x,v) - I_0(x,v) \tag{10}$$

where x is the cross-track position, I(x,v) is a representation of the measured tone-level characteristics 930 as a function of cross-track position and tone level, and $I_0(x,v)$ is a representation of the reference tone-level characteristics 935 as a function of cross-track position and tone level. Note that in an exemplary embodiment I(x,v) and $I_0(x,v)$ are represented in terms of scanner code values such that tone-level error function $\Delta_s(x,v)$ will be represented in terms of scanner code value differences. In other embodiments, a calibration process can be used to relate the scanner code values to corresponding input code values (i.e., the tone-level v) such that I(x,v) and $I_0(x,v)$ are represented in terms of input code values and the tone-level error function is represented in terms of corresponding input code value differences.

Figure 16:
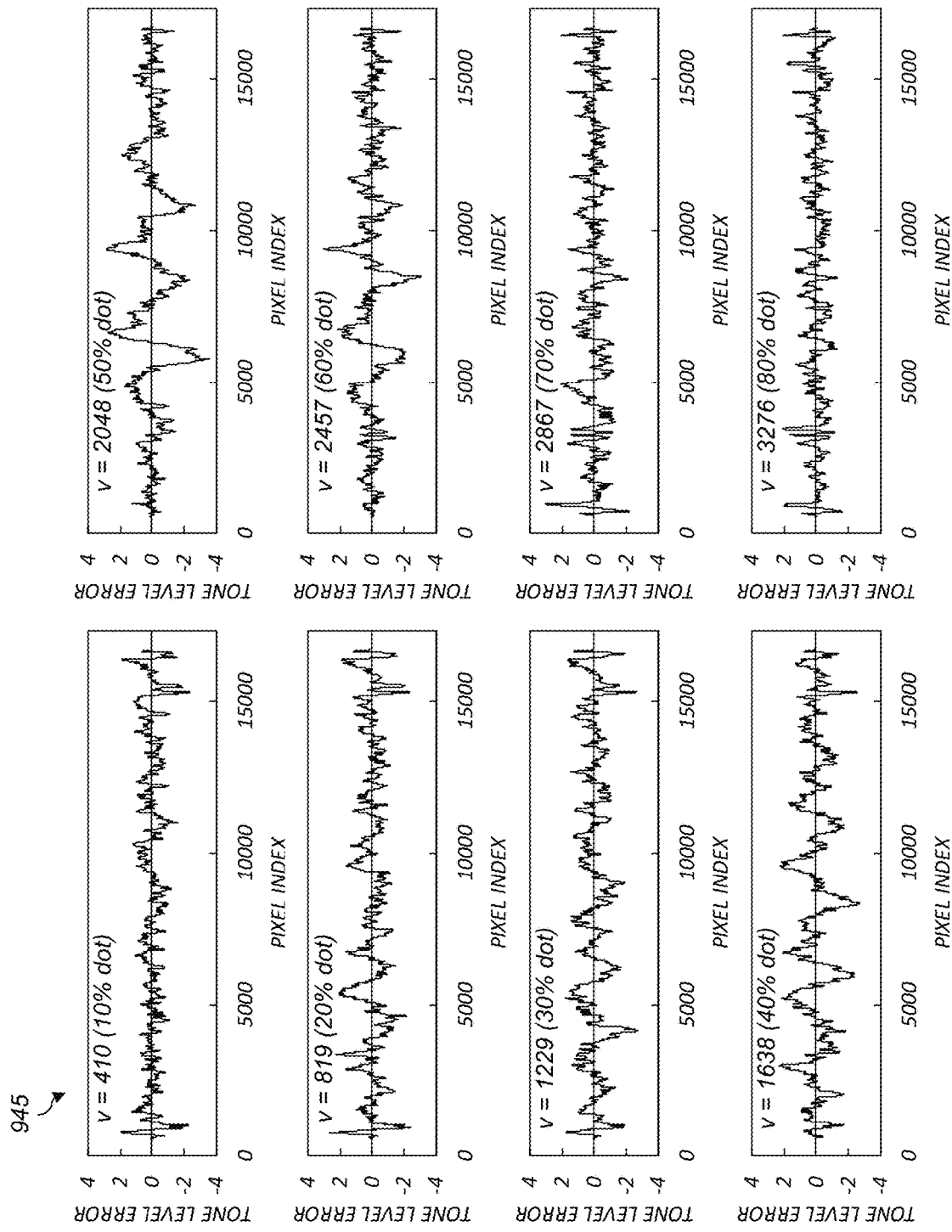
FIG. 16 is a graph showing exemplary tone-level errors as a function of cross-track position for a set of uniform test patches.

FIG. 16 shows a set of exemplary tone-level error characteristics 945 corresponding to the measured tone-level characteristics 930 of FIG. 15, where each of the individual graphs corresponds to a different one of the uniform test patches 575 having the indicated input code value v. It can be seen that the slowly-varying tone-level characteristics in the measured tone-level characteristics 930 of FIG. 15, which generally come from sources such as scanner non-uniformities, have been removed to leave only the localized tone-level non-uniformities corresponding to artifacts such as image streak. In this example, the tone-level error characteristics 945 in the graphs (i.e., the y-axis) is represented in terms of scanner code value differences. As will be discussed later, these can be related to input code value differences by applying a scanner calibration function.

A determine tone-level correction function step 950 (FIG. 13) is used to determine a tone-level correction function 805 that can be used to compensate for the tone-level error characteristics 945. In an exemplary embodiment, the tone-level correction function 805 is determined by inverting the determined tone-level error characteristics 945 and accounting for the slope of a scanner calibration function which relates the scanner code values to corresponding input code values (i.e., tone-level v):

$$\Delta_c(x,v) = -\Delta_s(x,v) \cdot \frac{dv}{ds} \tag{11}$$

where $\Delta_c(x,v)$ is the tone-level correction function 805, and dv/ds is the slope of a scanner calibration function which relates the scanner code values to corresponding input code values evaluated at the measured tone level.

In some embodiments, the scanner calibration function can be determined using a separate calibration process wherein a set of test patches having known input code values are printed and measured. In an exemplary embodiment the scanner calibration function can be determined directly from the measured tone-level characteristics 930 for the test target 900. For example, each uniform test patch 575 in the test target 900 has a known input code value (i.e., tone-level v). The measured tone-level characteristics 930 for each uniform test patch 575 can be analyzed to determine a corresponding average scanner code value. (In some embodiments, the average scanner code value can be determined from the smoothed nominal tone-level characteristics 935, and/or from only a central portion of the uniform test patch to remove any scanner artifacts which are typically larger near the edges of the image.) These values will then define a set of data points on the scanner calibration function. An interpolation process can then be used to fill in a complete scanner calibration function.

Figure 17:
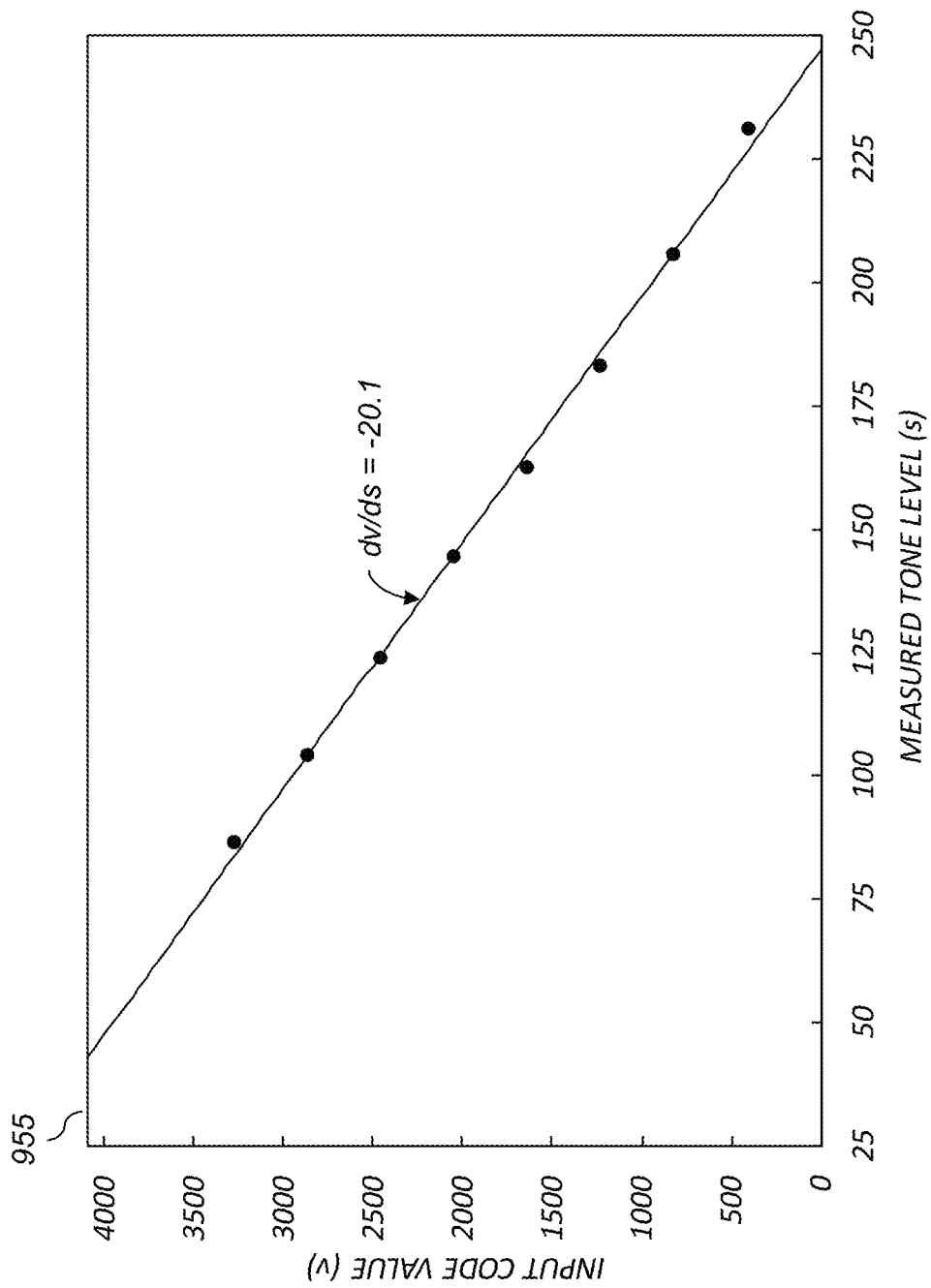
FIG. 17 is a graph of an exemplary scanner calibration function which relates scanner code values to corresponding input code values.

FIG. 17 is a graph of an exemplary scanner calibration function 955 which relates scanner code values to corresponding input code values. The eight data points for the scanner calibration function 955 were determined from the measured tone-level characteristics 930 of FIG. 15. A function is preferably fit to the measured data points to determine a continuous function having an x-axis which spans the full range of input code values. In this example, a linear function was fit to the measured data points. The slope of the linear calibration function is dv/ds=−20.1.

Figure 18:
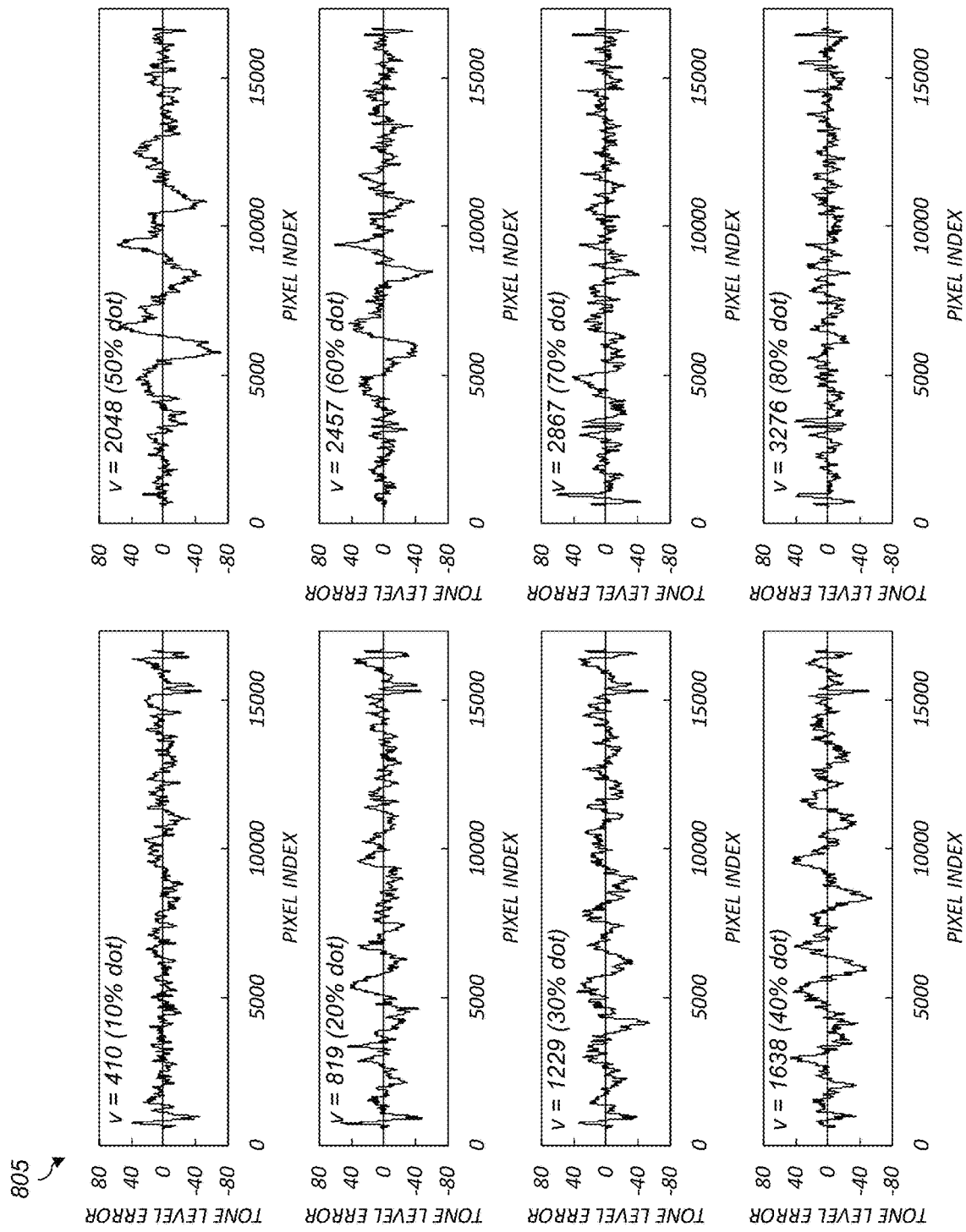
FIG. 18 illustrates an exemplary tone-level correction function.

FIG. 18 shows data for an exemplary tone-level correction function 805 determined from the tone-level error characteristics 945 of FIG. 16 and the scanner calibration function 955 of FIG. 17 using Eq. (11). The data corresponds to slices through the full tone-level correction function 805 at the tone-levels of the uniform test patches 575. In some embodiments, a full tone-level correction function 805 is determined by interpolating between the tone-levels of the uniform test patches 575. Preferably the interpolation process (e.g., a spline-fitting process) is constrained such that the tone-level correction values are zero for the minimum and maximum tone-levels (e.g., v=0 and 4095).

The tone-level correction function 805 can be used to determine corrected image data:

$$v_c(x,y) = v(x,y) + \Delta_c(x, v(x,y)) \tag{12}$$

where v(x,y) is the tone-level for a given input image pixel in the input digital image a particular cross-track position (x) and in-track position (y) within the image, and $v_c$(x,y) is the tone-level for the corresponding corrected image pixel. The term $\Delta_c$(x,v(x,y)) can be referred to as the tone-level correction for the image pixel at the (x, y) position.

The tone-level correction function 805 can be stored in memory for use in correcting digital images in a variety of different formats. For example, the tone-level correction function 805 can be stored as a two-dimensional look-up table which is addressed by the cross-track position (x) and the pixel value (v). In some embodiments, the two-dimensional look-up table can store tone-level corrections for every possible cross-track position and pixel value. This can require a relatively large amount of memory given that the number of cross-track positions can be as large as 17,280 or more, and the number of tone-levels can be as large 4096 (corresponding to 12-bit image data) or more. In some embodiments, the two-dimensional look-up table can store tone-level corrections for a sub-sampled set of cross-track positions and pixel values in order to reduce the required amount of memory. In this case, a two-dimensional interpolation algorithm can be used to determine tone-level corrections for cross-track positions and pixel values between the stored values.

In some embodiments, the tone-level correction function 805 can be represented using an appropriate parametric function in order to reduce the amount of memory required to store the function. In a preferred embodiment, the tone-level correction function 805 ($\Delta_c$(x,v)) is represented using a vector decomposition of the form:

$$\Delta_c(x, v) \cong \sum_{f=1}^{n} i_f(x) o k_f(v) \tag{13}$$

where $i_f$(x) and $k_s$(v) are one-dimensional feature vectors taken along the cross-track and pixel-value axes of the tone-level correction function 805, f is a feature vector index, n is the total number of feature vectors, and "o" is the outer vector product operator. In an exemplary embodiment, data for the tone-level correction function 805 such as that shown in FIG. 18 is stored in a two-dimensional array. For example, the two-dimensional array can have eight rows corresponding to the eight uniform test patches 575 and 17,280 columns corresponding to the set of printable cross-track pixel locations. A singular value decomposition algorithm can then be used to decompose the two-dimensional array into a set of one-dimensional feature vectors. Singular value decomposition algorithms are well-known in the art and are available in a variety of different commercially-available data analysis software packages.

In an exemplary embodiment, the singular value decomposition is determined on an $N_x \times N_p$ two-dimensional array where $N_x$ is the number of printable cross-track pixel locations (e.g., $N_x$=17,280) and N is the number of uniform test patches 575 (e.g., $N_p$=8). The result is a set of $N_x \times 1$ cross-track feature vectors 820 and a set of $1 \times N$ pixel-value feature vectors 825 An interpolation process (e.g., a spline interpolation) is then used to determine a set of $1 \times N_v$ pixel-value feature vectors 825 that spans the full range of input tone-levels, where $N_v$ is the number of input tone-levels (e.g., $N_v$=4096). Preferably the interpolation process is constrained such that the pixel-value feature vectors 825 are zero at the minimum and maximum tone-levels (e.g., v=0 and 4095). In other embodiments, the data for the tone-level correction function 805 determined for the set of uniform test patches 575 can be interpolated to determine an $N_x \times N_v$ two-dimensional array covering the full set of possible tone-levels as discussed earlier. In this case the singular value decomposition can be performed on the full $N_x \times N_v$ array such that no interpolation is required on the determined pixel-value feature vectors 825.

Figure 19:
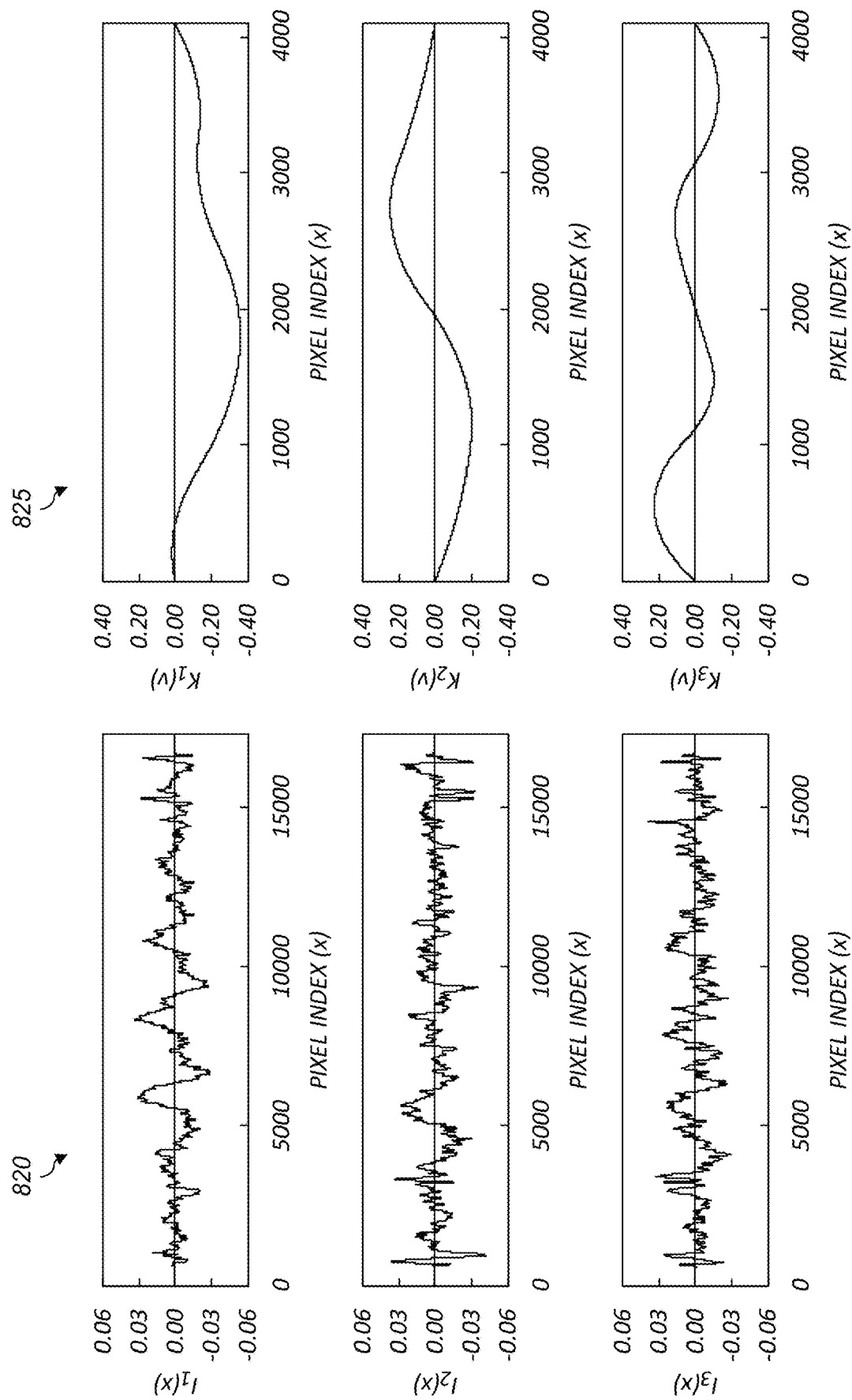
FIG. 19 illustrates an exemplary set of vectors determined to represent the tone-level correction function of FIG. 18.

FIG. 19 shows a set of cross-track feature vectors 820 ($i_f$(x)) and pixel-value feature vectors 825 ($k_f$(v)) for an exemplary singular value decomposition of the tone-level correction function 805 shown in FIG. 18. In this example, the SVD function in the commercially-available Matlab software application was used to perform the singular value decomposition with the total number of feature vectors being set to n=3. In other examples, different numbers of features vectors could be used, for example the numbers of features vectors could be in the range 1≤n≤10, or more typically in the range 2≤n≤4. The number of feature vectors that are appropriate for a particular application will depend on the non-uniformity characteristics of the particular printer.

It has been found that two-dimensional tone-level correction functions 805 of the form $\Delta_c$(x,v) are adequate to represent the required corrections for many printing systems where the predominant tone-level errors vary as a function of cross-track position and tone-level. However, in some cases the tone-level errors may also vary with in-track position (e.g., due to contributing factors such as roller imperfections that can impact in-track motion). In this case, the tone-level correction function 805 can be generalized to have the form $\Delta_c$(x,y,v), and the corresponding vector decomposition can be generalized to have the form:

$$\Delta_c(x, y, v) \cong \sum_{f=1}^{n} i_f(x) o j_f(y) o k_f(v) \tag{14}$$

where $j_f$(y) are one-dimensional feature vectors taken along the in-track axis. In this case, the corrected image data can be determined using a generalization of the relationship of Eq. (12):

$$v_c(x,y) = v(x,y) + \Delta_c(x,y,v(x,y)) \tag{15}$$

Figure 20:
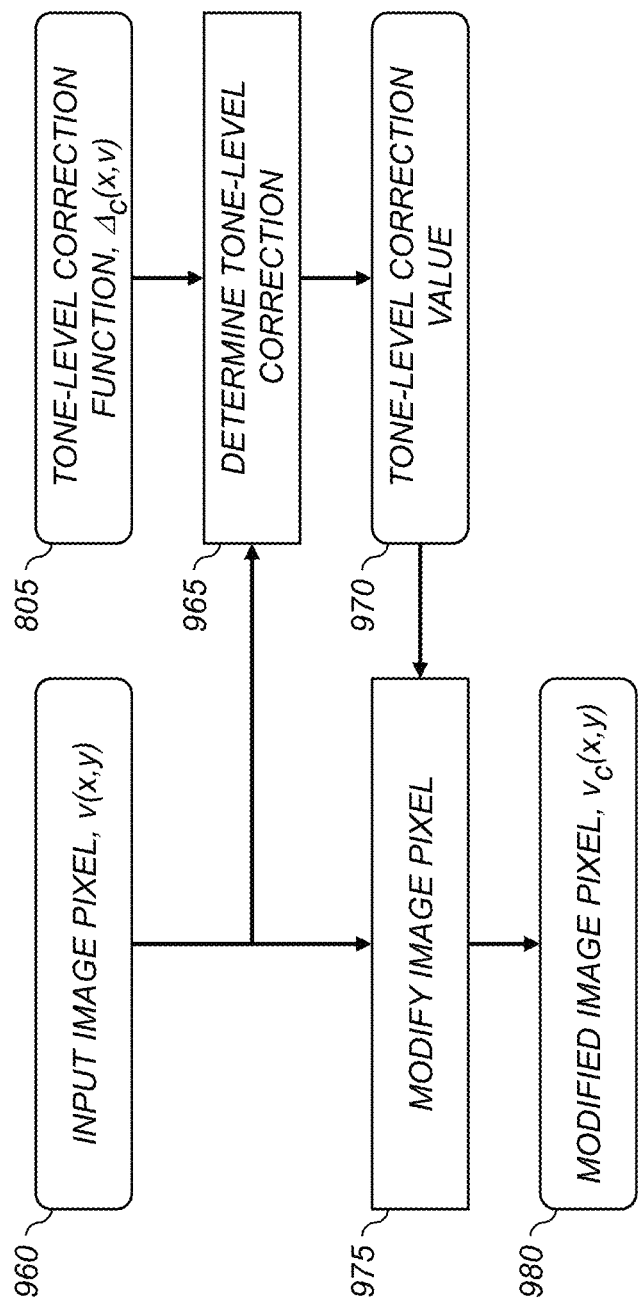
FIG. 20 shows a flowchart of a method for determining modified image pixels in accordance with an exemplary embodiment.

A flowchart of an exemplary process that can be used to modify the image pixels of an input digital image using the tone-level correction function 805 according to an exemplary embodiment is shown in FIG. 20. Each input image pixel 960 of the input digital image is processed by using a determine tone-level correction step 965 to determine a tone-level correction value 970 responsive to the tone-level correction function 805. In an exemplary embodiment, the tone-level correction function 805 is represented as a vector decomposition and the determine tone-level correction step 965 determines the tone-level correction value 970 using the relationship given in Eq. (13).

A modify image pixel step 975 is then used to determine a modified image pixel 980. In an exemplary embodiment, the modify image pixel step 975 determines the modified image pixel 980 by adding the tone-level correction value 970 to the pixel value of the input image pixel 960 as shown in Eq. (12). It will be obvious to one skilled in the art that in other embodiments other forms of modification functions could be used. For example, the tone-level correction function 805 can store scale values rather than difference values. In this case the tone-level correction value 970 would be a scale factor such that the modified image pixel 980 can be determined by multiplying the pixel value of the input image pixel 960 by tone-level correction value 970. In other embodiments, the tone-level correction function 805 can store the modified image values themselves rather than difference values that are added to the input pixel values to determine the modified image values. In this case, the determine tone-level correction step 965 and the modify image pixel step 975 are effectively combined into a single operation.

Figure 21:
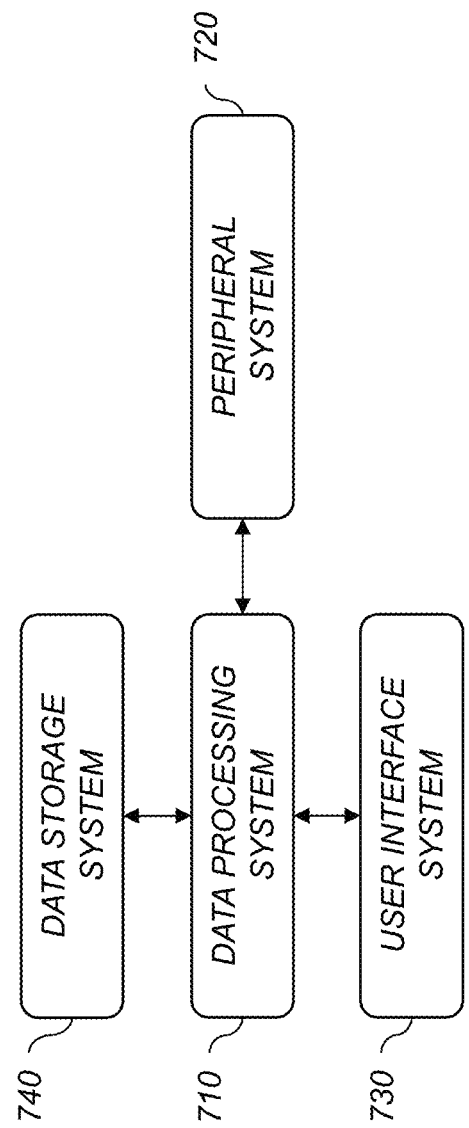
FIG. 21 is a high-level diagram showing the components of a system for processing images in accordance with the present invention.

FIG. 21 is a high-level diagram showing the components of a system for processing image data according to embodiments of the present invention. The system includes a data processing system 710, a peripheral system 720, a user interface system 730, and a data storage system 740. The peripheral system 720, the user interface system 730 and the data storage system 740 are communicatively connected to the data processing system 710.

The data processing system 710 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise. In some embodiments, the data processing system 710 a plurality of data processing devices distributed throughout various components of the printing system (e.g., the pre-processing system 305 and the print engine 370).

The data storage system 740 includes one or more processor-accessible memories configured to store information, including the information needed to execute the processes of the various embodiments of the present invention, including the example processes described herein. The data storage system 740 may be a distributed processor-accessible memory system including multiple processor-accessible memories communicatively connected to the data processing system 710 via a plurality of computers or devices. On the other hand, the data storage system 740 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 740 is shown separately from the data processing system 710, one skilled in the art will appreciate that the data storage system 740 may be stored completely or partially within the data processing system 710. Further in this regard, although the peripheral system 720 and the user interface system 730 are shown separately from the data processing system 710, one skilled in the art will appreciate that one or both of such systems may be stored completely or partially within the data processing system 710.

The peripheral system 720 may include one or more devices configured to provide digital content records to the data processing system 710. For example, the peripheral system 720 may include digital still cameras, digital video cameras, cellular phones, or other data processors. The data processing system 710, upon receipt of digital content records from a device in the peripheral system 720, may store such digital content records in the data storage system 740.

The user interface system 730 may include a mouse, a keyboard, another computer, or any device or combination of devices from which data is input to the data processing system 710. In this regard, although the peripheral system 720 is shown separately from the user interface system 730, the peripheral system 720 may be included as part of the user interface system 730.

The user interface system 730 also may include a display device, a processor-accessible memory, or any device or combination of devices to which data is output by the data processing system 710. In this regard, if the user interface system 730 includes a processor-accessible memory, such memory may be part of the data storage system 740 even though the user interface system 730 and the data storage system 740 are shown separately in FIG. 21.

A computer program product for performing aspects of the present invention can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations, combinations, and modifications can be effected by a person of ordinary skill in the art within the spirit and scope of the invention.

PARTS LIST 31 printing sub system
32 printing sub system
33 printing sub system
34 printing sub system
35 printing sub system
38 print image
39 fused image
40 supply unit
42 receiver
42a receiver
42b receiver
50 transfer sub system
60 fuser module
62 fusing roller
64 pressure roller
66 fusing nip 68 release fluid application substation
69 output tray
70 finisher
81 transport web
86 cleaning station
99 logic and control unit (LCU)
100 printer
111 imaging member
112 intermediate transfer member
113 transfer backup member
201 first transfer nip
202 second transfer nip
206 photoreceptor
210 charging subsystem
211 meter
212 meter
213 grid
216 surface
220 exposure subsystem
225 development station
226 toning shell
227 magnetic core
240 power source
300 page description file
305 pre-processing system
310 digital front end (DFE)
315 raster image processor (RIP)
320 color transform processor
325 compression processor
330 image processing module
335 decompression processor
340 halftone processor
345 image enhancement processor
350 image data
360 metadata
370 print engine
400 print engine
405 data interface
410 metadata interpreter
415 control signals
416 resolution modification flag
417 resize factor
418 halftoning flag
419 halftoning parameters
420 resolution modification processor
421 modify resolution test
422 resolution modification operation
425 halftone processor
426 halftone image test
427 halftoning operation
428 processed image data
430 printer module controller
435 printer module
450 printed image
500 input pixel
505 define high-resolution printer coordinates step
510 high-resolution printer coordinates
515 determine high-resolution dot coordinates step
520 high-resolution dot coordinates
525 determine high-resolution halftoned pixel values step
530 halftone dot function
535 high-resolution halftoned pixel values
540 average high-resolution halftoned pixel values step
545 halftoned pixel
550 more pixels test
570 alignment marks
575 uniform test patches
580 first color channel image content
581 second color channel image content
582 third color channel image content
583 fourth color channel image content
590 cross-track direction
595 in-track direction
600 dot shape function
605 threshold value function
610 edge softness function
615 edge softness function
620 halftoned image
625 halftoned image
710 data processing system
720 peripheral system
730 user interface system
740 data storage system
800 resolution/tone-level processor
805 tone-level correction function
810 tone-level correction operation
820 cross-track feature vectors
825 pixel-value feature vectors
900 test target
905 print test target step
910 printed test target
915 capture image step
920 captured image
925 analyze captured image
930 measured tone-level characteristics
935 nominal tone level characteristics
940 determine tone-level error characteristics step
945 tone-level error characteristics
950 determine tone-level correction function step
955 scanner calibration function
960 input image pixel
965 determine tone-level correction step
970 tone-level correction value
975 modify image pixel step
980 modified image pixel

The invention claimed is:

1. A method for correcting tone-level non-uniformities in a digital printing system, comprising:
   a) providing digital image data for a test target including a set of uniform test patches, each test patch having an associated pixel value and extending in a cross-track direction;
   b) printing the test target using the digital printing system to provide a printed test target;
   c) using a digital image capture system to capture an image of the printed test target;
   d) using a data processing system to automatically analyze the captured image to determine a measured tone-level as a function of cross-track position for each of the test patches;
   e) comparing the measured tone-levels to nominal tone-levels for each test patch to determine measured tone-level errors as a function of cross-track position for each of the test patches;
   f) determining a tone-level correction function responsive to the measured tone-level errors, wherein the tone-level correction function specifies tone-level corrections to be applied as a function of cross-track position and pixel value;
   g) storing a representation of the tone-level correction function in a digital memory, wherein the representation of the tone-level correction function includes a set of one-dimensional feature vectors corresponding to a decomposition of the tone-level correction function into a summation of outer vector products of the one-dimensional feature vectors;

h) receiving digital image data for an input digital image to be printed by the digital imaging system, wherein the digital image data specifies input pixel values for an array of image pixels;

i) determining corrected image data by:
   using the stored representation of the tone-level correction function to determine a tone-level correction value for each image pixel responsive to the input pixel value of the image pixel and the cross-track position of the image pixel; and
   modifying the input pixel value for each image pixel responsive to the determined tone-level correction value to provide a corrected pixel value; and j) printing the corrected image data using the digital printing system to provide a printed image with reduced tone-level errors;

wherein the decomposition of the tone-level correction function has the form:

$$\Delta_c(x, v) \cong \sum_{f=1}^{n} i_f(x) o k_f(v)$$

wherein $\Delta_c(x,v)$ is the tone-level correction function, $i_f(x)$ are one-dimensional feature vectors taken along the cross-track axis of the tone-level correction function, $k_f(v)$ are one-dimensional feature vectors taken along the pixel value axis of the tone-level correction function, x is the cross-track position, v is the pixel value, f is a feature vector index, n is the total number of feature vectors, and o is the outer vector product operator.

2. The method of claim 1, wherein the decomposition of the tone-level correction function is determined using a singular value decomposition algorithm.

3. The method of claim 2, wherein the singular value decomposition algorithm is applied to measured tone-level errors stored in an $N_x \times N_p$ array, where $N_x$ is the number of printable cross-track pixel locations and $N_p$ is the number of uniform test patches, to provide a set of $N_x \times 1$ cross-track feature vectors and a set of $1 \times N$ pixel-value feature vectors, and wherein an interpolation process is used to determine a set of $1 \times N_v$ pixel-value feature vectors responsive to the set of $1 \times N_p$ pixel-value feature vectors, where $N_v$ is the number of input pixel levels.

4. The method of claim 1, wherein the total number of feature vectors is in the range 2≤n≤4.

5. The method of claim 1, wherein the tone-level correction function is also a function of in-track position pixel.

6. The method of claim 4, wherein the decomposition of the tone-level correction function of the form:

$$\Delta_c(x, y, v) \cong \sum_{f=1}^{n} i_f(x) o j_f(y) o k_f(v)$$

wherein $\Delta_c(x,y,v)$ is the tone-level correction function, $i_f(x)$ are one-dimensional feature vectors taken along the cross-track axis of the tone-level correction function, $k_f(v)$ are one-dimensional feature vectors taken along the pixel value axis of the tone-level correction function, $j_f(y)$ are one-dimensional feature vectors taken along the in-track axis of the tone-level correction function, x is the cross-track position, y is the in-track position, v is the pixel value, f is a feature vector index, n is the total number of feature vectors, and o is the outer vector product operator.

7. The method of claim 1, wherein the input pixel values of the input digital image have an input bit depth, and further including converting the input pixel values of the input digital image to a higher bit depth prior to the step of determining the corrected image data.

8. The method of claim 7, wherein the higher bit depth is at least 10 bits/pixel.

9. The method of claim 7, wherein the higher bit depth is at least 12 bits/pixel.

10. The method of claim 1, wherein the corrected pixel value is determined by adding the determined tone-level correction value to the input pixel value.

11. The method of claim 1, wherein the step of printing the corrected image data includes applying a computational halftoning algorithm to the corrected image data to determine halftoned image data.

12. A method for correcting tone-level non-uniformities in a digital printing system, comprising:

a) providing digital image data for a test target including a set of uniform test patches, each test patch having an associated pixel value and extending in a cross-track direction;

b) printing the test target using the digital printing system to provide a printed test target;

c) using a digital image capture system to capture an image of the printed test target;

d) using a data processing system to automatically analyze the captured image to determine a measured tone-level as a function of cross-track position for each of the test patches;

e) comparing the measured tone-levels to nominal tone-levels for each test patch to determine measured tone-level errors as a function of cross-track position for each of the test patches;

f) determining a tone-level correction function responsive to the measured tone-level errors, wherein the tone-level correction function specifies tone-level corrections to be applied as a function of cross-track position and pixel value; and g) storing a representation of the tone-level correction function in a digital memory, wherein the representation of the tone-level correction function includes a set of one-dimensional feature vectors corresponding to a decomposition of the tone-level correction function into a summation of outer vector products of the one-dimensional feature vectors;

wherein the decomposition of the tone-level correction function has the form:

$$\Delta_c(x, v) \cong \sum_{f=1}^{n} i_f(x) o k_f(v)$$

wherein $\Delta_c(x,v)$ is the tone-level correction function, $i_f(x)$ are one-dimensional feature vectors taken along the cross-track axis of the tone-level correction function, $k_f(v)$ are one-dimensional feature vectors taken along the pixel value axis of the tone-level correction function, x is the cross-track position, v is the pixel value, f is a feature vector index, n is the total number of feature vectors, and ○ is the outer vector product operator.

\* \* \* \* \*